United States Patent
Barrows

(10) Patent No.: US 7,652,754 B2
(45) Date of Patent: Jan. 26, 2010

(54) FEATURE DETECTING VISION SENSOR

(76) Inventor: Geoffrey L. Barrows, 4905 Reno Rd., Washington, DC (US) 20008

( * ) Notice: Subject to any disclaimer, the term of this patent is extended or adjusted under 35 U.S.C. 154(b) by 0 days.

(21) Appl. No.: 11/905,851

(22) Filed: Oct. 4, 2007

(65) Prior Publication Data

US 2009/0168046 A1  Jul. 2, 2009

(51) Int. Cl.
*G01P 3/36* (2006.01)
(52) U.S. Cl. .......................... 356/28; 356/3.01; 356/3.1; 356/4.01; 356/4.1; 356/5.1
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 6,020,953 A | 2/2000 | Barrows | |
| 6,166,367 A | 12/2000 | Cho | |
| 6,194,695 B1 | 2/2001 | Barrows | |
| 6,384,905 B1 | 5/2002 | Barrows | |
| 6,750,953 B1 * | 6/2004 | Douglas | ............... 356/4.08 |
| 6,806,473 B2 | 10/2004 | Honda et al. | |
| 2003/0076484 A1 * | 4/2003 | Bamji et al. | ................ 356/5.1 |
| 2004/0165175 A1 * | 8/2004 | Muenter et al. | ........... 356/5.07 |
| 2005/0195383 A1 * | 9/2005 | Breed et al. | ............... 356/4.01 |
| 2007/0080280 A1 | 4/2007 | Havens | |
| 2007/0147682 A1 | 6/2007 | Chang et al. | |
| 2007/0154068 A1 | 7/2007 | Stein et al. | |

OTHER PUBLICATIONS

International Search Report and the Written Opinion of the International Searching Authority issued in International application No. PCT/US 08/78948 dated on Dec. 11, 2008.
Barrows, Geoffrey et al., Mixed-Mode VLSI Optical Flow Sensors for In-Flight Control of a Micro Air Vehicle, Jul. 2000, SPIE vol. 4109: Critical Technologies for the Future of Computing.

* cited by examiner

*Primary Examiner*—Thomas H Tarcza
*Assistant Examiner*—Luke D Ratcliffe
(74) *Attorney, Agent, or Firm*—McDermott Will & Emery LLP

(57) ABSTRACT

A visual sensor for generating an array of binarized feature signals based on a visual field is provided. The visual sensor comprises an array of photoreceptor circuits capable of generating photoreceptor signals based on the visual field, an array of feature detectors capable of generating feature signals based on the photoreceptor signals, and a reconfigurable binary generator array capable of generating binarized feature signals based on the feature signals.

22 Claims, 13 Drawing Sheets

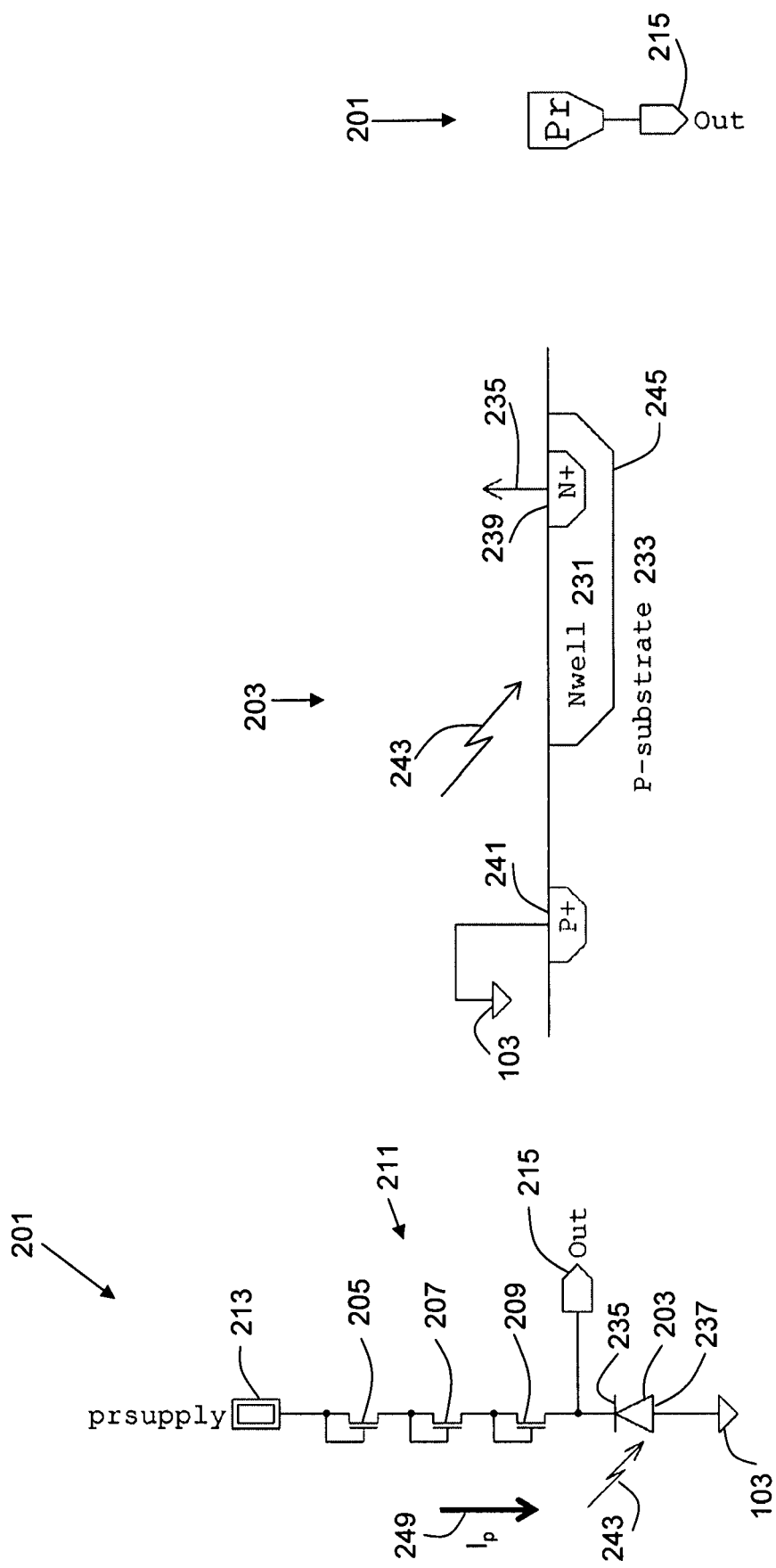

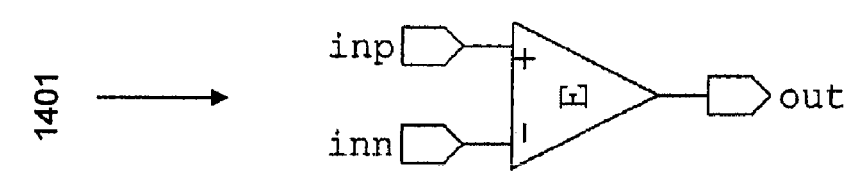
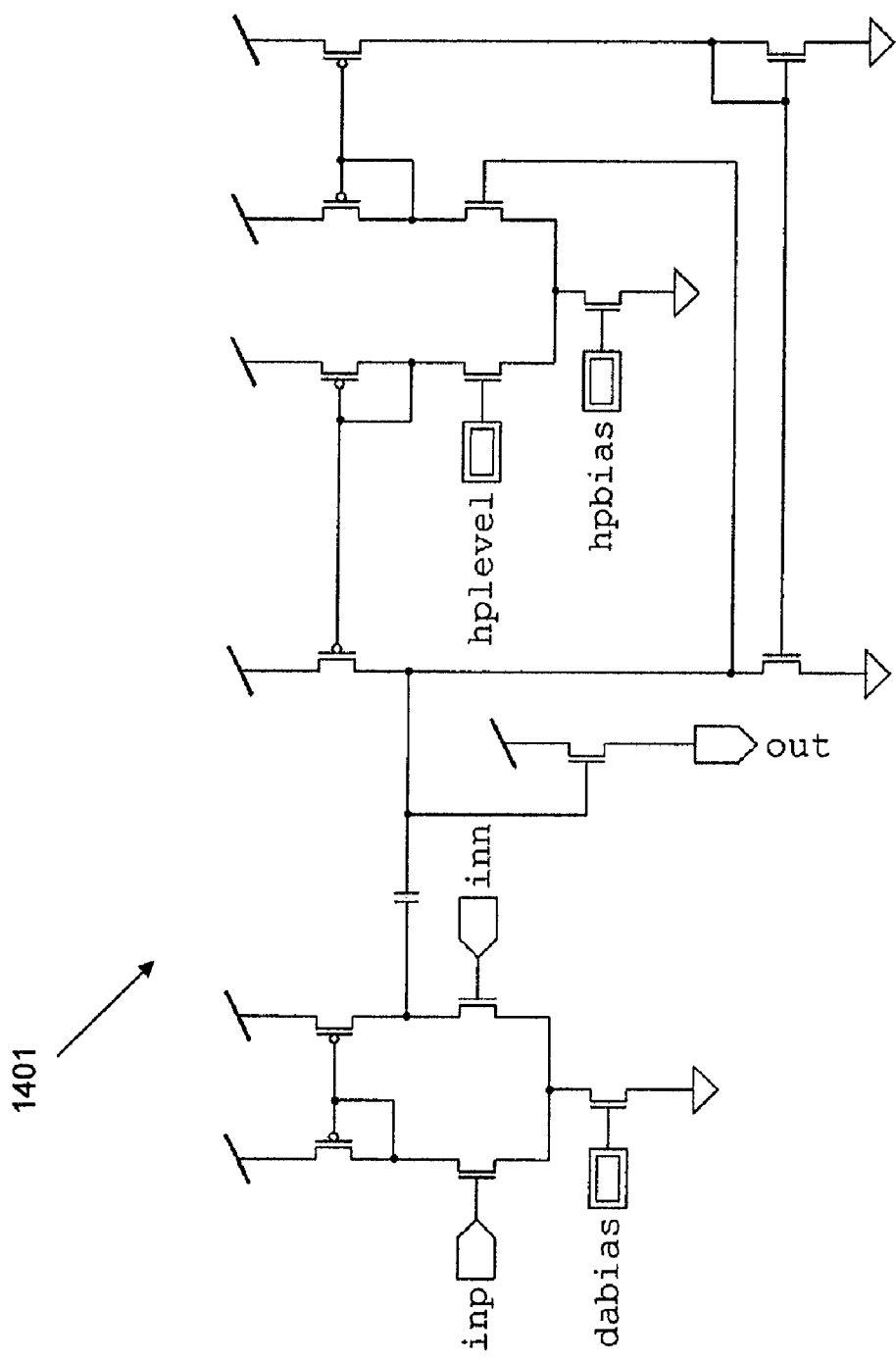
FIG. 10B
FIG. 10A

FEATURE DETECTING VISION SENSOR

FEDERALLY SPONSORED RESEARCH

This invention was made with Government support under Contract No. FA865106C0127 awarded by the United States Air Force. The Government has certain rights in this invention.

TECHNICAL FIELD

The teachings presented herein relate to electronic visual sensors.

BACKGROUND

The term "optical flow" generally refers to the apparent motion of texture seen by an agent (such as an animal or a robot) as a result of relative motion between the agent and other objects in the environment. It is well known that animals, especially insects, use information from optical flow for depth perception and navigating through an environment without colliding into obstacles. An introduction to the concept of optical flow may be found in the book "The Ecological Approach to Visual Perception", by J. Gibson, published by Lawrence Erlbaum Associates in 1986. Some examples of how insects utilize optical flow for navigation may be found in issue 199(1) of the Journal of Experimental Biology, edited by Wehner, Lehrer, and Harvey, and published in 1996 by The Company of Biologists Limited. Robotics and machine vision researchers have borrowed from these examples in biology to build machine vision systems that use optical flow for depth perception and obstacle avoidance in real environments. Examples of how optical flow may be used to perform some robotic tasks may be found in the paper "Biological Inspired Visual Sensing and Flight Control" by Barrows, Chahl, and Srinivasan, which appeared in the March 2003 issue of The Aeronautical Journal published by The Royal Aeronautical Society. Many other examples may be found in the academic literature.

The term "optical flow" is generally described in the academic literature as a vector field, with the domain of the vector field equal to the spherical visual field and the vectors representing the apparent velocity of visual texture in the visual field. In this document, the term "optical flow" will be used in a broader sense to include all types of visual motion that may be measured.

Machine vision systems capable of computing optical flow or visual motion in a compact package may be implemented with the use of specialized hardware. An imaging sensor is a device that is capable of sensing imagery based on light focused thereon. A machine visual sensing system or a vision sensor may be defined as an imaging sensory system having both image sensing and image processing functions, whether these functions are all performed primarily on a single chip or on a multiple chip system. In a "neuromorphic" approach, some or all computations may be performed with analog or mixed-signal circuits (i.e. mixed analog and digital) which exploit the physical dynamics inherent in VLSI (very large scale integration) circuitry and may additionally mimic biological structures. One source that provides such "neuromorphic" approaches is a book entitled "Analog VLSI and Neural Systems" by C. Mead, published by Addison Wesley in 1989. A related approach is to use "vision chips", which are defined herein to be integrated circuits having both image acquisition circuitry and image processing circuitry in the same device, including within the same monolithic die. One book that provides methods of implementing vision chips is "Towards the Visual Microprocessor" edited by T. Roska and A. Rodríguez-Vázquez, and published by Wiley in 2001. Another book that provides methods of implementing vision chips is "Vision Chips" by A. Moini and published by Kluwer Academic Publishing in 1999. When either of the above mentioned approaches is properly executed, it is possible to implement a machine vision system capable of performing a given set of tasks in a package substantially smaller than that when utilizing a conventional CMOS (complementary metal-oxide-semiconductor) or CCD (charge coupled device) imager connected to a high-performance processor.

In U.S. Pat. No. 6,020,953, a motion sensing apparatus and method, referred herein as the "competitive feature tracker" (CFT) algorithm, are disclosed. The approach described therein can be implemented using a vision chip. One instance of the aforementioned apparatus or algorithm may be referred to as an "elementary motion detector" or "EMD" that produces an optical flow measurement computed based on the motion of a specific feature across the visual field. Although a device implementing this apparatus or algorithm may be able to measure optical flow when exposed to real-world textures and, hence, able to measure optical flow even when the texture contrast is significantly lower than what is normally found in nature, the device may make occasional erroneous measurements especially as the texture contrast becomes even lower.

To address this issue, a method of fusing EMD outputs in order to increase the reliability of the optical flow measurement was developed, which is disclosed in U.S. Pat. No. 6,384,905. An optical flow sensor as described therein utilizes multiple arrays of feature detectors, with each array configured to track a different feature across the visual field. This sensor implements multiple EMDs that monitor the same portion of the visual field, with each EMD monitoring the motion with respect to a different feature. The output of each individual EMD may be referred to as a "velocity report" since it is a single report of the measured optical flow velocity. The sensor then combines the velocity reports produced by different EMDs in such a manner that individual erroneous velocity reports are filtered out. The sensor then produces a single optical flow measurement that is statistically more reliable.

Further details on the implementation of the teachings of the two aforementioned patents may be found in the following papers: "Feature Tracking Linear Optic Flow Sensor Chip" by Miller and Barrows and included in the proceedings of the IEEE 1999 International Symposium on Circuits and Systems (ISCAS'99); "Fusing Neuromorphic Motion Detector Outputs for Robust Optical Flow Measurement" by Barrows, Miller, and Krantz and included in the proceedings of the IEEE 1999 International Joint Conference on Neural Networks (ISCAS'99); and "Mixed-Mode VLSI Optical Flow Sensors for In-Flight Control of a Micro Air Vehicle" by Barrows and Neely and included in SPIE Volume 4109, published by SPIE in 2000. Further details may also be found in the Ph.D. dissertation entitled "Mixed-Mode VLSI Optic Flow Sensors for Micro Air Vehicles" written by Barrows in 1999 at the University of Maryland at College Park. Additional details may be found in the book chapter "Optical Flow Sensors for UAV Navigation" by Barrows, Neely, and Miller, which was published as part of the book entitled "Fixed and Flapping Wing Aerodynamics for Micro Air Vehicle Applications" and published by AIAA in 2001.

Although the sensors described in the two aforementioned patents are practical, there is a remaining issue. With regard to the sensor disclosed in the aforementioned U.S. Pat. No.

6,384,905, when an optical flow sensor utilizes multiple feature detector arrays to implement multiple EMDs, each feature detector array requires its own circuitry. As a result, this increases the amount of circuitry required to implement the optical flow sensor and, therefore, limits how compact such circuitry can be implemented on a chip. This correspondingly limits the number of instances of such circuits that can be fit onto a chip of a fixed area and thus limits the resolution of the sensor. Therefore, a method for detecting different features without requiring additional circuitry for each individual feature type is needed.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2A illustrates an exemplary photoreceptor circuit;

FIG. 2B illustrates a cross section of a photodiode in a photoreceptor circuit according to an embodiment of the present teaching;

FIG. 2C illustrates a schematic symbol used to signify a photoreceptor circuit according to an embodiment of the present teaching;

FIG. 10A depicts an exemplary schematic diagram for a non-selectable edge detector circuit according to an embodiment of the present teaching;

FIG. 10B illustrates an exemplary schematic symbol used to signify a non-selectable edge detector circuit;

CONVENTIONS AND DEFINITIONS

Figure 1D:
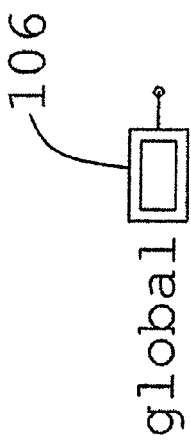
FIG. 1 depicts several schematic symbols that will be used to signify various electronic components and connections used in exemplary embodiments of the present teaching.
Figure 1E:
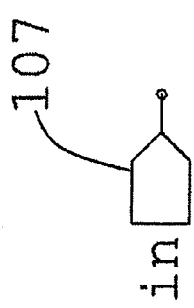
Figures 1F, 1G, 1H:
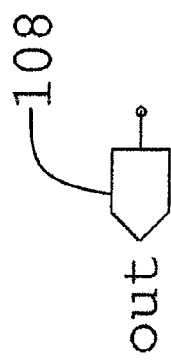
Figure 1A:
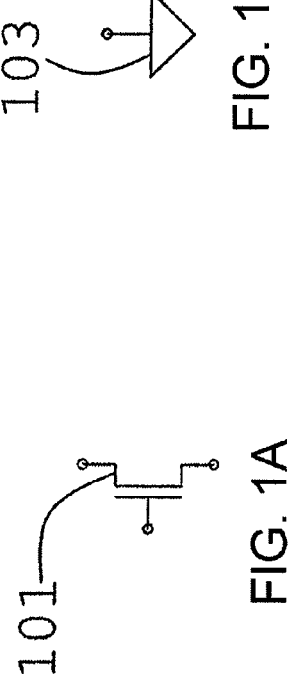
Figure 1B:
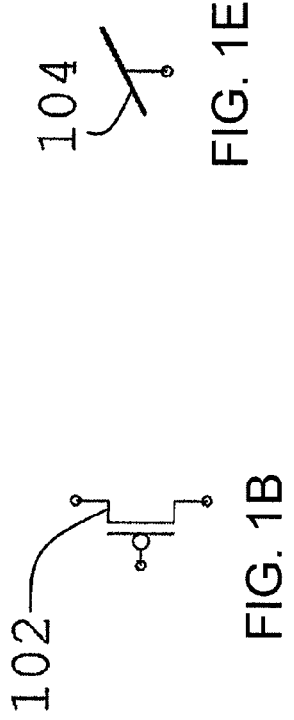
Figure 1C:
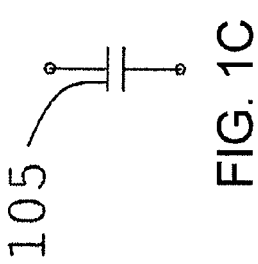

Refer to FIGS. 1A-1H, which show several circuit diagram symbols that will be used to signify various electronic components and connections in the present teachings. In FIG. 1A, symbol 101 depicts an N-channel MOSFET (metal-oxide-semiconductor field effect transistor), also referred to as an NMOS transistor or an N-FET transistor. In FIG. 1B symbol 102 depicts a P-channel MOSFET, also referred to as a PMOS transistor or a P-FET transistor. In FIG. 1D, symbol 103 depicts a reference potential which will be referred to as Ground or GND. In FIG. 1E, symbol 104 depicts a power supply potential which will be referred to as Power or VDD. In FIG. 1C, symbol 105 depicts a capacitor. In FIG. 1F, symbol 106 depicts a global node or a global signal. In this example, this global node is given the name "global". Global nodes may be electrical nodes that are commonly connected in all instances of the circuit depicted and any other circuits. Examples of global nodes may include bias voltages or global clock signals.

In addition, in FIG. 1G, symbol 107 depicts an input node. In this example, this input node is given the name "in". Input nodes are electrical nodes of a particular circuit that may receive signals from other circuits. In FIG. 1H, symbol 108 depicts an output node. In this example, this output node is given the name "out". Output nodes are electrical nodes of a particular circuit that may generate signals used by other circuits.

DESCRIPTIONS OF EXEMPLARY EMBODIMENTS

A photoreceptor circuit is any circuit that may be configured to generate at least one signal, called a "photoreceptor signal", that represents the amount of light that is striking the circuit. FIG. 2A depicts an exemplary photoreceptor circuit 201. The photoreceptor circuit 201 comprises an N-well photodiode 203, which sinks to ground 103 an amount of current proportional to the amount of light striking the photodiode 203. The photodiode 203 may also be constructed from other diode or phototransistor structures such as diffusion-to-substrate structures or phototransistors, or any appropriate photoconductive element that conducts electricity according to the amount of light striking the photoconductive element. Three diode-connected N-channel transistors 205, 207, and 209 connected in series form a transduction circuit 211. Photodiode 203 is connected to one end of the transduction circuit 211. The other end of the transduction circuit 211 is connected to the global photoreceptor power supply node prsupply 213. The photoreceptor circuit contains one output node out 215.

FIG. 2B, illustrates a cross section of photodiode 203 in photoreceptor circuit 201 according to an embodiment of the present teaching. In this exemplary embodiment, the photodiode 203 may be implemented with an N-well 231 that is lying in a lightly doped P-substrate 233. The N-side 235 of the photodiode may be implemented using an N-diffusion contact 239 within the N-well 231. The P-side 237 of the photodiode 203 is located within the P-substrate 233, and may be connected to ground 103 via a substrate P-contact 241 located near the N-well 231. The P-substrate 233 may thus be considered equivalent to ground 103.

The circuit as illustrated in FIG. 2A operates as follows. Since the photodiode 203 is reverse-biased, its N-side 235 is more positive than its P-side 237. When there is no light (e.g., in the dark), the photodiode 203 conducts no current other than a small amount of current generated by heat (known as "dark current"). When light 243 strikes the photodiode 203, electron-hole pairs are generated near the junction 245 between the P-substrate 233 and the N-well 231. This allows electrons to flow up from the P-substrate 233 to the N-well 231 and out through the N-side 235. This results in current $I_p$ 249 flowing from the global node prsupply 213, through the transduction circuit 211, the photodiode 203, and into the substrate 233. In this description, the direction of current flow is the direction of "hole flow" which is the opposite direction as that of electron flow. The prsupply node 213 is set to a positive voltage sufficient for the diode-connected N-channel transistors 205, 207, and 209 to be forward-biased and for the node out 215 to have a positive voltage.

As the amount of light 243 striking the photodiode 203 increases, so does the current 249 flowing through the circuit. This current $I_p$ 249 results in a voltage potential across the transduction circuit 211 that increases as the current $I_p$ 249 increases. The voltage potential at node out 215 thus decreases as the current $I_p$ 249 increases. In many real-world environments, the transistors 205, 207, and 209 operate in the subthreshold mode, which means that the voltage drop across them is a logarithmic function of the current $I_p$ 249. Thus the voltage at node out 215 would be a logarithmic function of the amount of light striking the photodiode 203. This voltage potential at node out 215 becomes the output of the exemplary photoreceptor circuit. The signal located at node out 215 is thus the "photoreceptor signal" generated by the photoreceptor circuit 201.

FIG. 2C illustrates a schematic symbol used to signify a photoreceptor circuit according to an embodiment of the present teaching. The photoreceptor circuit 201 shown in FIGS. 2A and 2C is an exemplary realization of a photoreceptor circuit that generates a photoreceptor signal based on light. The fabrication of such circuits is a well-known art. Any circuit that may be configured to generate at least one photoreceptor signal based on light is candidate for use as a photoreceptor circuit. Note that a photoreceptor may be realized using any other implementations known in the art and the description presented herein is for illustration purposes and does not limit the scope of the present teaching.

An array of photoreceptor circuits may be used with an optical apparatus, such as a lens or a pinhole, to sample a portion of the visual field. This may be performed by placing the photoreceptor circuits at the focal plane of the lens, or at a predetermined distance from the pinhole, so that an image of the visual field is formed on the photoreceptor circuits. The light patterns projected by the optical assembly onto the photoreceptor circuits may be referred to as an "image". The act of generating photoreceptor signals based on the image may be referred to as the act of "grabbing an image".

Figures 3A, 3B:
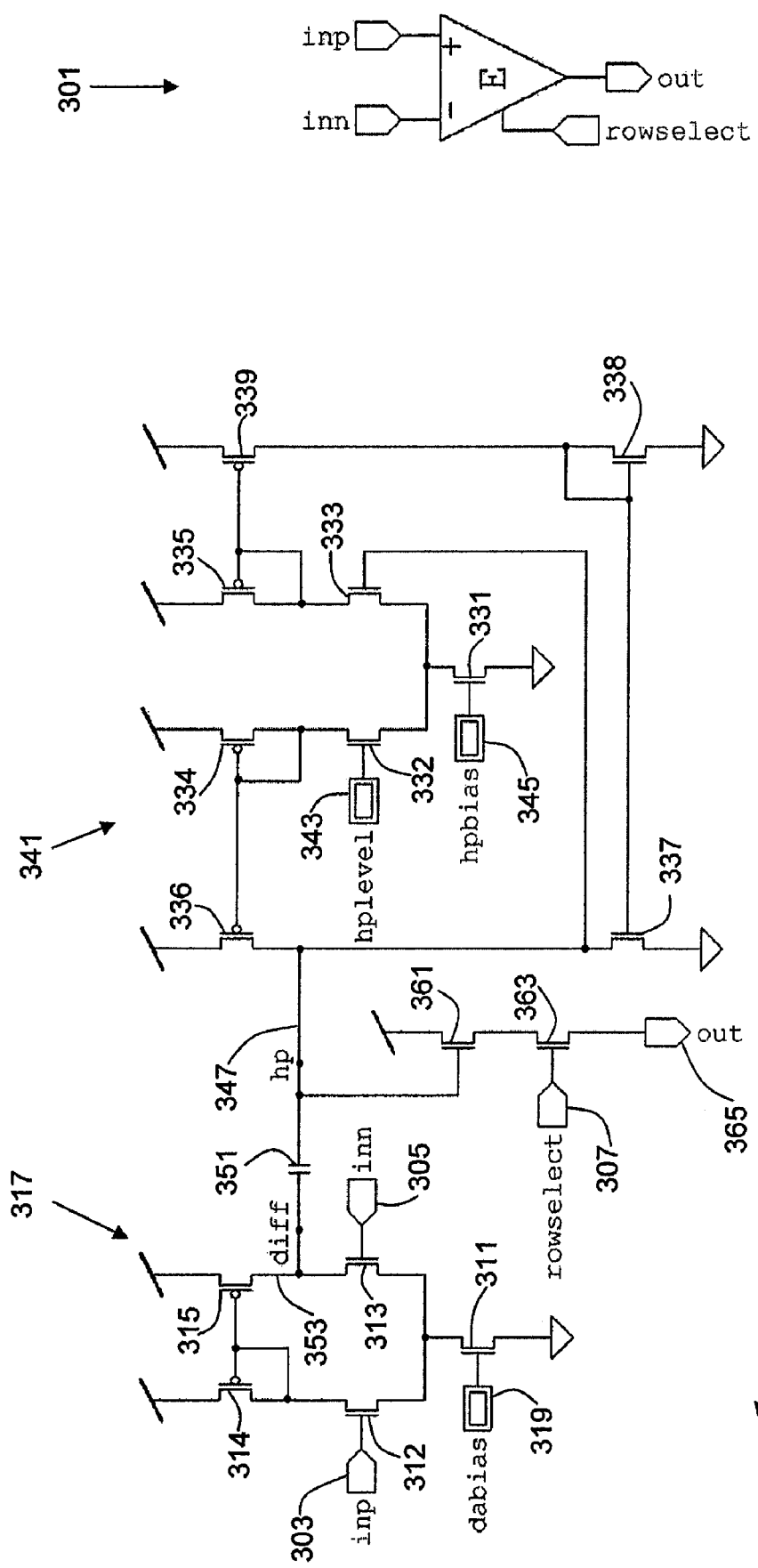
FIG. 3A illustrates an exemplary edge detector circuit.
FIG. 3B illustrates a schematic symbol used to signify an edge detector circuit.

An edge detector circuit is any circuit that may be configured to respond to an edge imagery based on one or more photoreceptor signals. Refer to FIG. 3A, which illustrates an exemplary edge detector circuit 301. This exemplary circuit, as shown, has three inputs: an analog positive input inp 303, an analog negative input inn 305, and a digital input signal rowselect 307. The circuit of FIG. 3A computes the difference between the two analog inputs inp 303 and inn 305, puts the difference through a time domain high-pass filter, and provides an output when rowselect 307 is a digital high.

In this exemplary embodiment, the five transistors 311, 312, 313, 314, and 315 form a classic five-transistor differential amplifier 317. The global node dabias 319 is set to a potential that allows current to flow through the differential pair of transistors 312 and 313. The node dabias 319 effectively turns transistor 311 into a current source. Transistors 314 and 315 form a current mirror, in which transistor 315 is configured to provide a current approximately equal to the source-drain current flowing through transistor 314. Transistors 314 and 315 used in this manner form an "active load", which may enable the differential amplifier 317 to have a differential voltage gain on the order of tens or hundreds or more. This high voltage gain is because the "load resistance" seen by the amplifier is based on channel length modulation in transistors 315 and 313. The output of the differential amplifier 317 is at the node entitled diff 353. Any differential amplifier having an active load at the output may be referred to as a differential amplifier with an active load. In addition, any differential amplifier whose voltage gain is substantially determined by channel length modulation (or the Early effect when using bipolar junction transistors) in the amplifier's transistors whose drains (or collectors when using bipolar transistors) are connected to the differential amplifier's output node may also be referred to as a differential amplifier having an active load. Differential amplifier 317 may thus be referred to as a five-transistor differential amplifier with an active load.

In the illustrated embodiment, the nine transistors 331, 332, 333, 334, 335, 336, 337, 338, and 339 form an "operational transconductance amplifier" or "OTA" 341 that is configured to have its negative input connected to its output. The OTA circuit 341 is biased with two global nodes hplevel 343 and hpbias 345. The potential of hplevel 343 is set to a potential approximately midway between ground 103 and power 104. The potential of hpbias 345 may be set to a potential slightly above ground 103 such that the nine transistors of the OTA 341 are operating in the subthreshold mode. OTA 341 gently pulls the voltage at node hp 347 towards the potential set by global node hplevel 343. From the perspective of node hp 347, the OTA circuit 341 behaves as a high value resistor with one end connected to hp 347 and the other end connected to hplevel 343, and whose resistance is determined by the bias hpbias 345.

In the illustrated embodiment, the differential amplifier 317 and OTA 341 are connected together using a capacitor 351. When connected as such, the voltage at node hp 347 will effectively be a time domain high-passed version of the differential amplifier output diff 353, with a cutoff frequency determined by the potential hpbias 345 and the value of the capacitor 351. When the input signals inp 303 and inn 305 are non-changing or varying very slowly, the node hp 347 will tend to have a potential close to that of global node hplevel 343. When the input signals inp 303 and inn 305 are varying quickly, then the potential hp 347 will vary much like signal diff 353, except that hp 347 and diff 353 will be different by the potential across capacitor 351. Therefore, the capacitor 351 and OTA 341 together effectively behave as a time-domain high pass filter.

In the illustrated embodiment, the purpose of the time domain high pass filter is two-fold. First, the high pass filter eliminates offset inherent in the differential amplifier 317 circuitry and in any input circuits generating inn 305 and inp 303. Second, the high pass filter passes signals that are changing in time, which corresponds to visual motion, while eliminating signals that are not changing in time. Other circuits may be used in place of the capacitor 351 and OTA 341 to implement a time domain high pass filter, and any circuit that substantially passes changing signals while substantially eliminating or reducing non-changing signals may be referred to as a time domain high pass filter.

In the illustrated embodiment, transistors 361 and 363 provide a means of reading out the potential hp 347 to the output node out 365 whenever the digital signal rowselect 307 is switched high. The description of how this is performed will be deferred until the description of FIG. 4. This resulting signal at node out 365 is referred to hereinafter as an "edge signal". When the inputs inp 303 and inn 305 receive photoreceptor signals as inputs, then the edge detector circuit will have a strong response when a visual edge moves in between the photoreceptor circuits providing the two inputs. The response will be positive, i.e. node hp 347 rising above hplevel 343 in potential, or negative, i.e. node hp 347 falling below hplevel 343 in potential, depending on which input gets the brighter side of the visual edge.

FIG. 3B illustrates a schematic symbol used to signify an edge detector circuit.

The exemplary edge detector circuit 301, as shown in FIG. 3A, may generate an edge signal based on one or more photoreceptor signals. The fabrication of differential amplifier circuits and high-pass filter circuits is a well-known art. Any circuit that may be configured to generate at least one edge signal based on one or more photoreceptor signals may be referred to as an edge detector circuit or simply as an edge detector. Furthermore the output of any edge detector circuit may be referred to as an edge signal.

Likewise, the five-transistor differential amplifier 317 is an exemplary implementation of a differential amplifier having an active load circuit. A differential amplifier may be implemented in any way known in the art and, as understood, the illustration described herein does not limit the scope of the present teaching. A differential amplifier can be any circuit or device having at least two inputs and at least one output, and generates an output signal that is substantially a linear function of two inputs. Furthermore, a differential amplifier may be referred to as having an "active load" if it is able to produce an output using active devices, such as transistors, and substantially without use of a passive resistor, or if the output resistance seen by the differential amplifier and thus it's gain is due substantially to channel length modulation (or equivalently the Early effect when using bipolar junction transistors) in it's transistors whose drains (or collectors when using bipolar junction transistors) are connecting to the output node.

Figure 4:
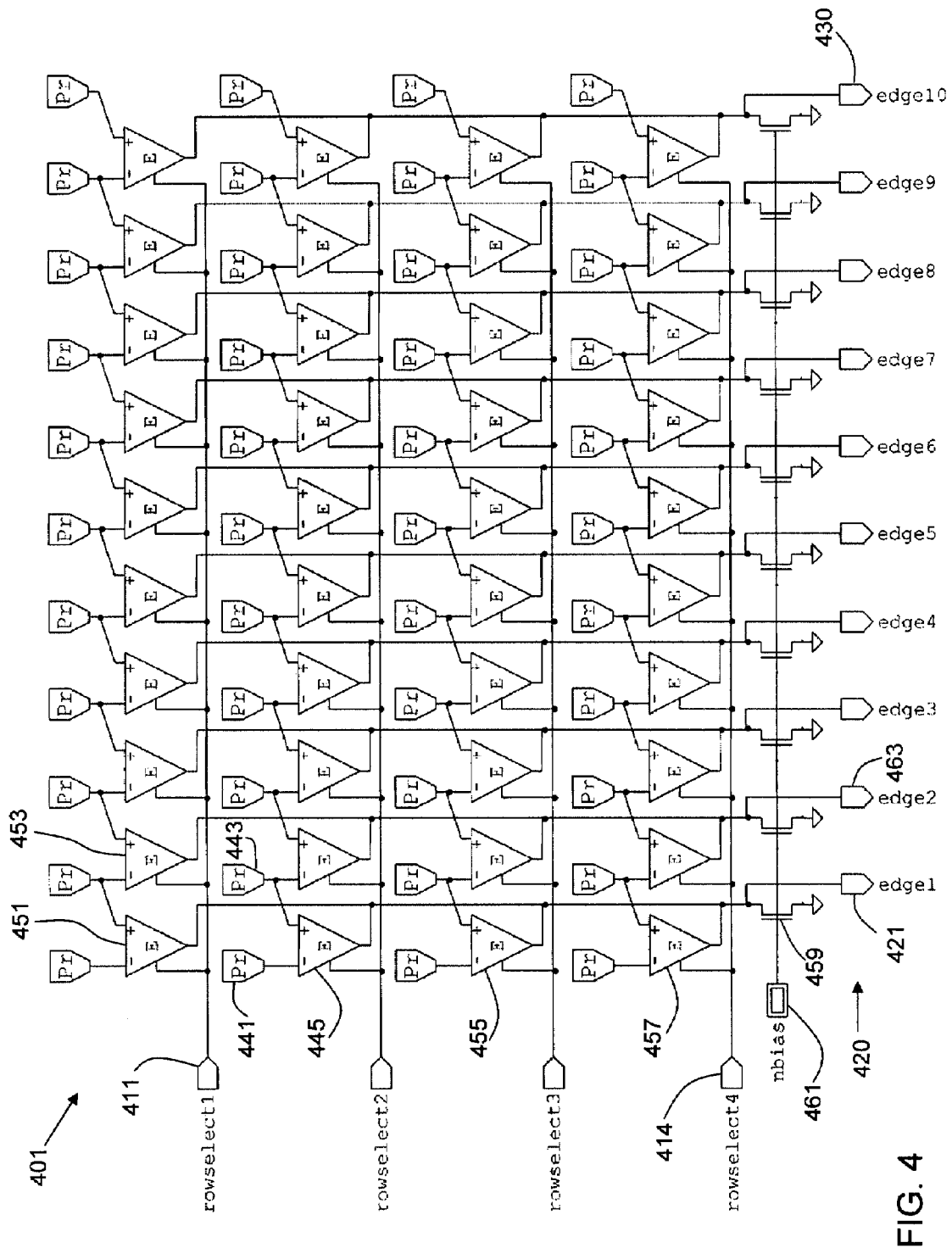
FIG. 4 illustrates an exemplary focal plane circuit.

A focal plane circuit is any circuit that may lie at an image formed by an optical apparatus and generates an array of photoreceptor signals based on the image, and generates signals based on the photoreceptor signals. A focal plane circuit may also be referred to as a focal plane array. Refer to FIG. 4, which illustrates an exemplary focal plane circuit 401. For purposes of discussion, this focal plane circuit 401 is drawn as having an array of four rows and eleven columns. This exemplary circuit has an array four digital row select inputs rowselect1 411 through rowselect4 414. This exemplary circuit also has an array 420 of ten analog edge signal nodes edge1 421 through edge10 430. This exemplary circuit also has a four-by-eleven array of photoreceptor circuits from FIG. 2A and a four-by-ten array of edge detector circuits from FIG. 3A arranged and connected as shown in FIG. 4. Each individual edge detector circuit receives as analog inputs the outputs of two adjacent photoreceptors. For example, as shown in the exemplary circuit of FIG. 4, the output of photoreceptor 441 is connected to the inn 305 input of edge detector circuit 445, while the output of photoreceptor 443 is connected to the inp 303 input of edge detector circuit 445. This connectivity pattern is repeated across the entire focal plane circuit 401.

In the illustrated embodiment, all of the edge detector circuits in a row have their respective row select inputs 307 connected to the same row select line. For example, the row select inputs of edge detector circuits 451 and 453, and another edge detector circuits on the top row, are connected to the digital line rowselect1 411.

In the illustrated embodiment, all of the edge detector circuits in a column have their respective output nodes out 365 connected together to the same edge signal node. Each edge signal node is also connected to an N-channel transistor, called a "column readout transistor", which serves as a current source for an entire column of edge detector circuits. For example, in the illustrated embodiment the outputs of edge detectors 451, 445, 455, and 457 are all connected to the same edge signal node edge1 421, and node edge1 421 is also connected to column readout transistor 459. All of the column readout transistors have their gates connected to a common global node nbias 461, which is set to a voltage sufficiently positive for the column readout transistors to turn on and operate in the saturated mode.

The focal plane circuit 401 in the illustrated embodiment operates as follows. As light strikes the focal plane circuit 401, the exemplary photoreceptor circuits generate corresponding photoreceptor signals that are provided to the edge detector circuits. The differential amplifier 317 of each edge detector circuit computes the difference between the edge detector's two input photoreceptor signals. This implements an "edge detector" function that will be familiar to persons skilled in the art of image processing. The capacitor 351 and OTA 341 of each edge detector circuit then computes a time domain high passed version of this difference. All of the exemplary photoreceptor circuits and exemplary edge detector circuits in the focal plane circuit 401 operate similarly and in parallel, so that the node hp 347 of each edge detector circuit is ready to be read out if rowselect 307 is set high.

The edge detector circuit outputs in the illustrated embodiment are read out as follows: When one of the rowselect lines is turned high, its corresponding row of edge detector circuits is connected to the edge signal nodes 420. For example, when rowselect1 411 is high, edge detector 451 is connected to edge signal node edge1 421 and edge detector 453 is connected to edge output node edge2 463. No more than one of the rowselect lines should be high at one time in the illustrated embodiment. When an edge detector circuit's rowselect input 307 is set to digital "high", it is said that the edge detector is "selected". When an edge detector circuit is so selected, its internal transistors 361 and 363 plus the column readout transistor from the bottom of FIG. 4 form a source follower circuit, whereby the output voltage follows that of the edge detector's node hp 347. In this manner, the hp 347 signals of an entire row of edge detectors are placed onto the edge signal nodes 420.

Note that although the focal plane circuit 401 in the illustrated embodiment is described as having four rows of eleven exemplary photoreceptor circuits and four rows of ten edge detector circuits generating a total of ten edge signals, the actual size of the array may be practically any size. Larger array sizes will allow a higher resolution images to be obtained. Note also that the exemplary focal plane circuit 401 of FIG. 4 depicts one of many possible architectures for constructing a focal plane circuit comprising photoreceptor circuits and edge detector circuits. Note that a focal plane circuit may be realized using any other implementations known in the art and the description presented herein is for illustration purposes and does not limit the scope of the present teaching.

Figures 5A, 5B:
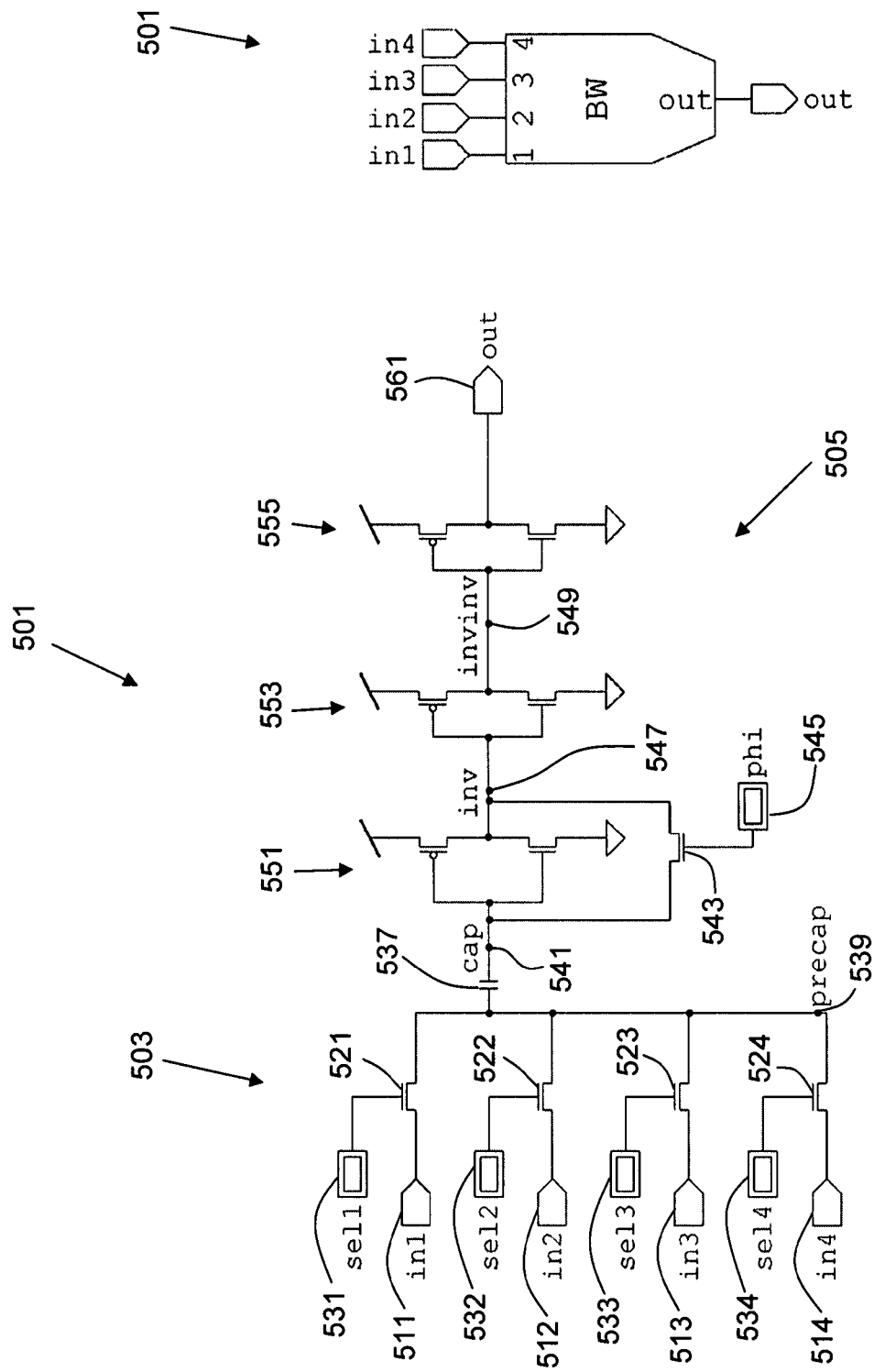
FIG. 5A illustrates an exemplary binary generator circuit.
FIG. 5B illustrates an exemplary schematic symbol used to signify a binary generator circuit.

In the illustrated embodiment, the function of a binary generator circuit is to receive as input one or more edge signals, or other substantially analog inputs, and generate a binary value based on the edge signals. Refer to FIG. 5A, which illustrates an exemplary binary generator circuit 501.

The first section of the exemplary binary generator circuit 501 is the input section 503, which comprises four analog inputs in1 511 through in4 514, four input transistors 521 through 524, four global switch signals sel1 531 through sel4 534, and a capacitor 537. The input section 503 is arranged as shown in the figure so that one of the analog inputs may be connected to capacitor 537 at node precap 539. The switch signals sel1 531 through sel4 534 determine the input to which capacitor 537 is connected. For example, when switch signal sel1 531 is high, and the other three switch signals sel2 532 through sel4 534 are low, node precap 539 is connected to input in1 511 via transistor 521. In this case, it is said that "capacitor 537 is connected to input in1 511".

The second section of the exemplary binary generator circuit 501 is the inverter section 505, which comprises three inverters 551, 553, and 555. Each inverter may be formed from a P-transistor and an N-transistor as shown in FIG. 5A. The inverters may also equal to each other in terms of the geometries of their respective P- and N-transistors. The input of inverter 551 is connected to the right-hand side of capacitor 537 at node cap 541. The input and output of inverter 551 may be shorted together with transistor 543, which occurs whenever global node phi 545 is set to digital high. The output of inverter 551 provides the input to inverter 553 at node inv 547. The output of inverter 553 provides the input to inverter 555 at node invinv 549. The output of inverter 555 becomes output node out 561.

Note that the input section 503 and inverter section 505 together form a switched capacitor circuit that may be used to compare the potential of one analog input with another. This is because capacitor 537 may be "switched" from one input to another. The switched capacitor circuit may be also referred to as a flash comparator circuit. The circuit 501 is one of many possible switched capacitor circuits that may be implemented. The exemplary binary generator circuit 501 may be operated as follows:

First, signal phi 545 is set to digital high, thus closing transistor 543 and shorting together the input and output of inverter 551. When this happens, nodes cap 541 and inv 547 settle to a value between Ground 103 and the Power 104 which will be referred to as the "middle voltage" or "Vmid".

Second, one of the four input global switch signals is set to a digital high. As an example, suppose the global node sel1 531 is set high, connecting node precap 539 to input in1 511. Suppose that the potential at node in1 511 is the value Vin1. The voltage across capacitor 537, defined as the potential at node cap 541 minus the potential at node precap 539, will equal the value "Vmid−Vin1".

Third, signal phi 545 is set to digital low, which opens transistor 543 so that the input and output of inverter 551 are no longer shorted together. This also causes node cap 541, on the right-hand side of capacitor 537, to float. In this state the potential across the capacitor does not substantially change and thus remains approximately equal to "Vmid−Vin1". Small deviations from this value may be possible as a result of injection charge from transistor 543 switching off, however this injection charge may be minimized by implementing transistor 543 to have a small gate area, by increasing the size of capacitor 537, and/or by using a pass-gate in place of transistor 543.

Fourth, the currently high global switch signal is turned off, and at the same time (or shortly thereafter) another global switch signal is turned on. To continue the example, suppose global switch signal sel1 531 is turned low, and then global switch signal sel2 532 is turned high. This would connect the capacitor 537 to input in2 512. Because the potential across capacitor 537 is still "Vmid−Vin1", the voltage at node cap 541 will now become:

Vcap=Vin2+(Vmid−Vin1)=Vmid+(Vin2−Vin1).

Suppose the potential at input in2 512 is more positive than the potential at input in1 511. Then (Vin2−Vin1) is a positive number. This causes the potential at the input of inverter 551 at node cap 541 to be greater than Vmid. This causes node inv 547 at the output of inverter 551 to have a potential significantly less positive than Vmid. This in turn causes the node invinv 549 to have a high digital value, and the node out 561 to have a low digital value.

Now suppose the potential at input in2 512 is less positive than the potential at input in1 511. Then (Vin2−Vin1) is a negative number. This causes the potential at the input of inverter 551 at node cap 541 to be less than Vmid, which in turn causes inverter 551 to output at node inv 547 a potential significantly higher than Vmid. The result is that node invinv 549 will have a low digital value, and the node out 561 will have a high digital value.

When the exemplary binary generator circuit 501 is operated as such, the node out 561 will have a digital high value when Vin1>Vin2 and a digital low value when Vin1<Vin2. In the case of Vin1=Vin2, factors such as noise, mismatch between transistors, injection charge in transistor 543, and parasitic capacitance will generally cause the circuit 501 to tend towards either that of Vin1>Vin2 or Vin1<Vin2.

Above we demonstrated how the exemplary binary generator circuit 501 may be used to compare the voltage at input in2 512 with that of in1 511. In the case of the above example, it can be said that the binary generator circuit 501 generates an output using the function "output 1 if Vin1>Vin2, and output 0 otherwise". This function may be referred to as a "binarization function". By properly closing different input transistors in sequence, it is possible to compare any one of the four input signals with any other and thus implement other binarization functions. For example, the binary generator circuit 501 may instead be operated to compute the binarization function "output 1 if Vin3>Vin2, and output 0 otherwise". The binary generator circuit may thus be operated, or "reconfigured" to generate a binary value according to a variety different binarization functions. Because of this, the circuit 501 may also be referred to as a "reconfigurable binary generator circuit".

If the input signals to the binary generator circuit 501 are edge signals, for example edge signals generated by the exemplary focal plane circuit 401, then the signal at the output node out 561 may be referred to as a "binarized edge signal".

FIG. 5B illustrates an exemplary schematic symbol used to signify a binary generator circuit 501, including the location of the inputs in1 511 through in4 514 and the output out 561.

The binary generator circuit 501 shown in FIG. 5A is one of many realizations of binary generator circuit that may generate a binary value based on one or more analog inputs. Any circuit that may be configured to generate one or more binary values based on one or more analog inputs may be referred to as a binary generator circuit. Furthermore, the circuit 501 is one of many realizations of a reconfigurable binary generator circuit that may be reconfigured to generate at least one binary value based on a selectable binarization function. Any circuit that may be reconfigured to generate one or more binary values based on one or more analog inputs according to a selectable binarization function may be referred to as a reconfigurable binary generator circuit. Note that a binary generator circuit or a reconfigurable binary generator circuit may be realized using any other implementations known in the art and the description presented herein is for illustration purposes and does not limit the scope of the present teaching.

The binary generator circuit 501 shown in FIG. 5 is also one of many realizations of a switched capacitor circuit that may be used to generate a binary value based on one or more analog inputs. A switched capacitor circuit is defined hereinafter as any circuit with the following two characteristics: 1) a switched capacitor circuit comprises at least one amplifier or inverter and a network of capacitors and switches, including when the switches are implemented with transistors or pass-gates, and 2) a switched capacitor circuit has the ability to generate one or more output signals based on one or more input signals by using the switches to change how the capacitors are connected in the network. For example, the binary generator circuit 501 is able to compute whether Vin2>Vin3 by reconnecting the capacitor 537 from input in2 512 to in3 513 using switching transistors 522 and 523. Any switched capacitor that is able to generate a binary output based on one or more analog inputs may be used as a binary generator circuit. Note that a switched capacitor circuit may be realized using any other implementations known in the art and the description presented herein is for illustration purposes and does not limit the scope of the present teaching.

Figure 6:
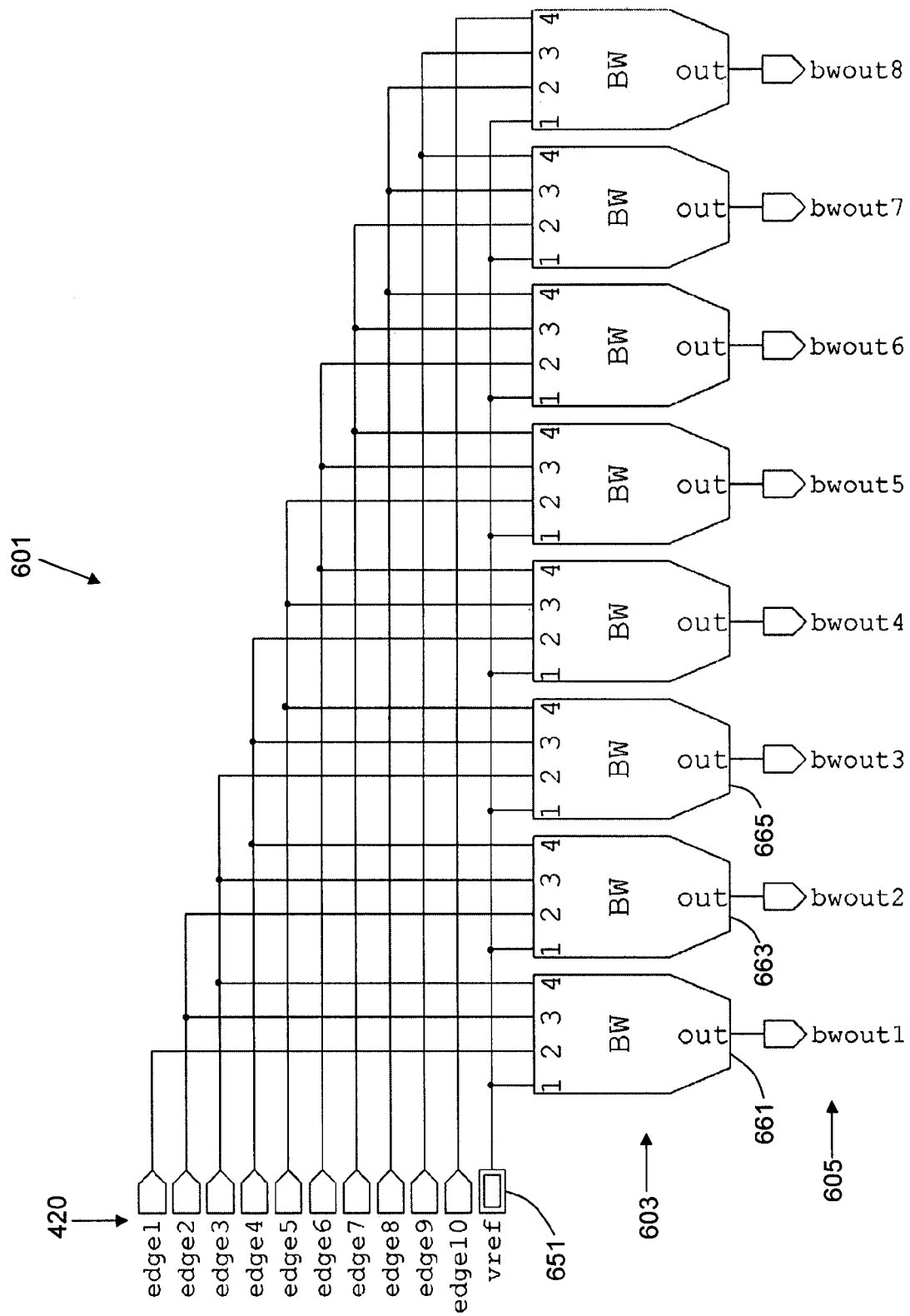
FIG. 6 illustrates an exemplary binary generator array.

A binary generator array is an array of binary generator circuits configured to generate an array of binary signals based on an array of edge signals (or other analog signals). Refer to FIG. 6, illustrates an exemplary binary generator array 601 that generates eight binary values based on ten analog edge signals. This circuit receives as input the ten edge signals 420 of FIG. 4, and provides them to an array 603 of eight binary generator circuits. The outputs 605 bwout1 through bwout8 of the eight binary generator circuits 603 are thus binarized edge signals and form the eight bit output of the binary generator array 601. The eight binary generator circuits 603 are connected to the inputs 420 as follows:

First, input in1 511 of every binary generator circuit in the exemplary binary generator array 601 is connected to a common global node vref 651. This enables the comparison of edge signals to a reference voltage, if this is so desired.

Second, the binary generator circuits in the exemplary binary generator array 601 are connected in a staggered pattern. Inputs in2, in3, and in4 from binary generator circuit 661 are respectively connected to edge signals edge1, edge2, and edge3. Inputs in2, in3, and in4 from binary generator 663 are respectively connected to edge signals edge2, edge3, and edge4. Inputs in2, in3, and in4 from binary generator 665 are respectively connected to edge signals edge3, edge4, and edge5. The remaining binary generator circuits are similarly connected, as shown in FIG. 6. Larger or smaller binary generator arrays having more or fewer binary generator circuits may be similarly constructed.

The function of the exemplary binary generator array 601 is to take as an input the ten edge signals 420 edge1 through edge10 and generate eight binarized edge signals 605 bwout1 through bwout8 based on the ten input signals 420 in a manner selected through usage of the global switch signals 531 through 534. Suppose that the binary generator global signals are driven so that the binarization function computed in the binary generator circuits is "output 1 if Vin3>Vin2, and output 0 otherwise". Suppose that the values of the ten edge signals 420 are as follows:

edge1 potential=2.0 Volts
edge2 potential=2.5 Volts
edge3 potential=3.0 Volts
edge4 potential=2.5 Volts
edge5 potential=2.0 Volts
edge6 potential=1.5 Volts
edge7 potential=2.5 Volts
edge8 potential=3.0 Volts
edge9 potential=3.5 Volts
edge10 potential=2.5 Volts The binary pattern contained by output signals bwout1 through bwout8 will be 11000111 (with bwout1 equaling digital "1" and having the left-hand position in this word), since edge2>edge1, edge3>edge2, edge4<edge3 and so on.

The exemplary binary generator array 601 shown in FIG. 6 is one of many realizations of a binary generator array that may generate an array of binary values based on analog inputs. Any circuit that may be configured to generate an array of binary values based on an array of analog inputs may be referred to as a binary generator array. This includes any binary generator arrays that are not themselves constructed from an array of binary generator circuits. Furthermore, the circuit 601 is one of many realizations of a reconfigurable binary generator array that may be reconfigured to generate an array of binary values according to a selectable binarization function. Any circuit that may be reconfigured to generate an array of binary values based on one or more analog inputs according to a selectable binarization function may be referred to as a reconfigurable binary generator array. Note that a circuit for generating an array of binary values based on an array of input analog signals may be realized using any other implementations known in the art and the description presented herein is for illustration purposes and does not limit the scope of the present teaching.

Figure 7:
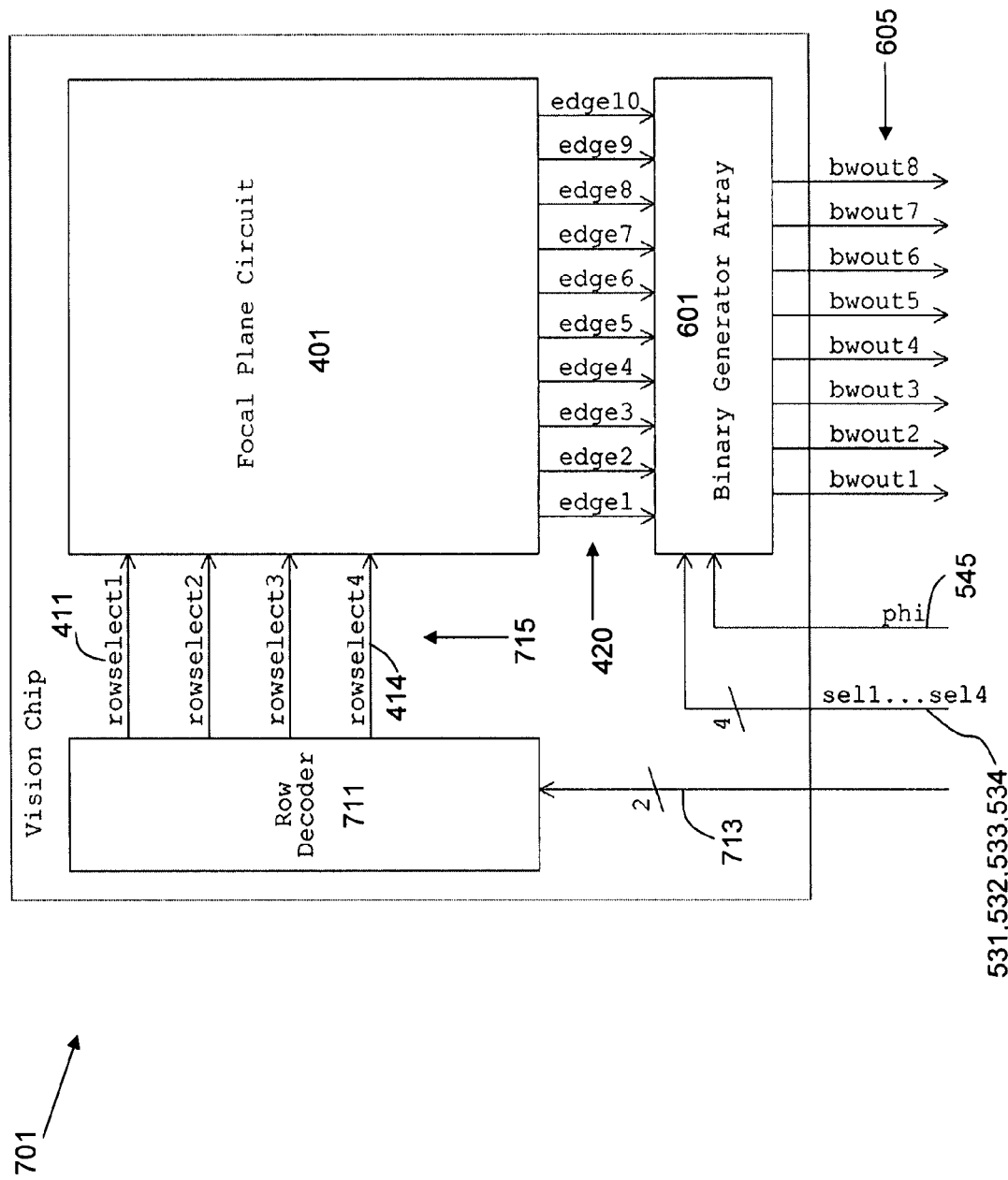
FIG. 7 illustrates the schematic of an exemplary edge detecting vision chip.

Refer to FIG. 7, which illustrates the schematic of an exemplary edge detecting vision chip 701. As described above, a vision chip is an imaging chip having both photoreceptor circuits and image processing circuits on the same die. A vision chip may be mounted at a position with respect to an optical assembly, such as a lens, to grab an image from a field of view visible by the optical assembly and the vision chip.

The exemplary edge detecting vision chip 701 comprises three elements, a row decoder circuit 711, the focal plane circuit 401 of FIG. 4, and the reconfigurable binary generator array 601 of FIG. 6. The row decoder circuit 711 receives as input a two-bit row command signal 713 and generates the array of row select signals rowselect1 411 through rowselect4 414 based on the row command signal 713. The focal plane circuit receives as input the row select signals rowselect1 411 through rowselect4 414 and generates as an output the array of edge signals 420. The reconfigurable binary generator array 601 receives as input the array of edge detector signals 420 and generates an array of binarized edge signals 605. The reconfigurable binary generator array 601 also receives as input the switch signals sel1 531 through sel4 534 and the signal phi 545.

In the exemplary edge detecting vision chip 701 the row command signal 713 contains an index number to select an individual row. For example the pattern "00" may indicate that rowselect1 is turned on, "01" may indicated that rowselect2 is turned on, and so forth. The row decoder 711 may be implemented with a decoder circuit.

The exemplary edge detecting vision chip 701 may be modified by changing the size of the arrays or by utilizing different versions of photoreceptor circuits, edge detector circuits, and/or reconfigurable binary generator arrays.

The exemplary edge detecting vision chip 701 may be operated to generate an array of binarized edge signals for each row of the focal plane circuit 401. First row command signal 713 is set so that rowselect1 411 is set high to select the first row of the focal plane circuit 401. Then the reconfigurable binary generator array 601 is operated to generate binarized edge signals based on the edge signals from the first row. Then the second row of the focal plane circuit 401 is selected, and an array of binarized edge signals is generated based on the second row's edge signals. The remaining rows of the focal plane circuit 401 may be processed in this manner. The resulting binarized edge signals from all four rows form a two dimensional array of binary values that may be referred to as a binarized image. Another binarized image may be generated by operating the reconfigurable binary generator array 601 to implement a different binarization function. A collection of binarized images generated using different binarization functions may also collectively be referred to as a binarized image.

Note that an edge detecting vision chip may be realized using any other implementations known in the art and the description presented herein is for illustration purposes and does not limit the scope of the present teaching. The vision chip 701 and modifications thereof may be referred to as "visual sensors".

Figure 8:
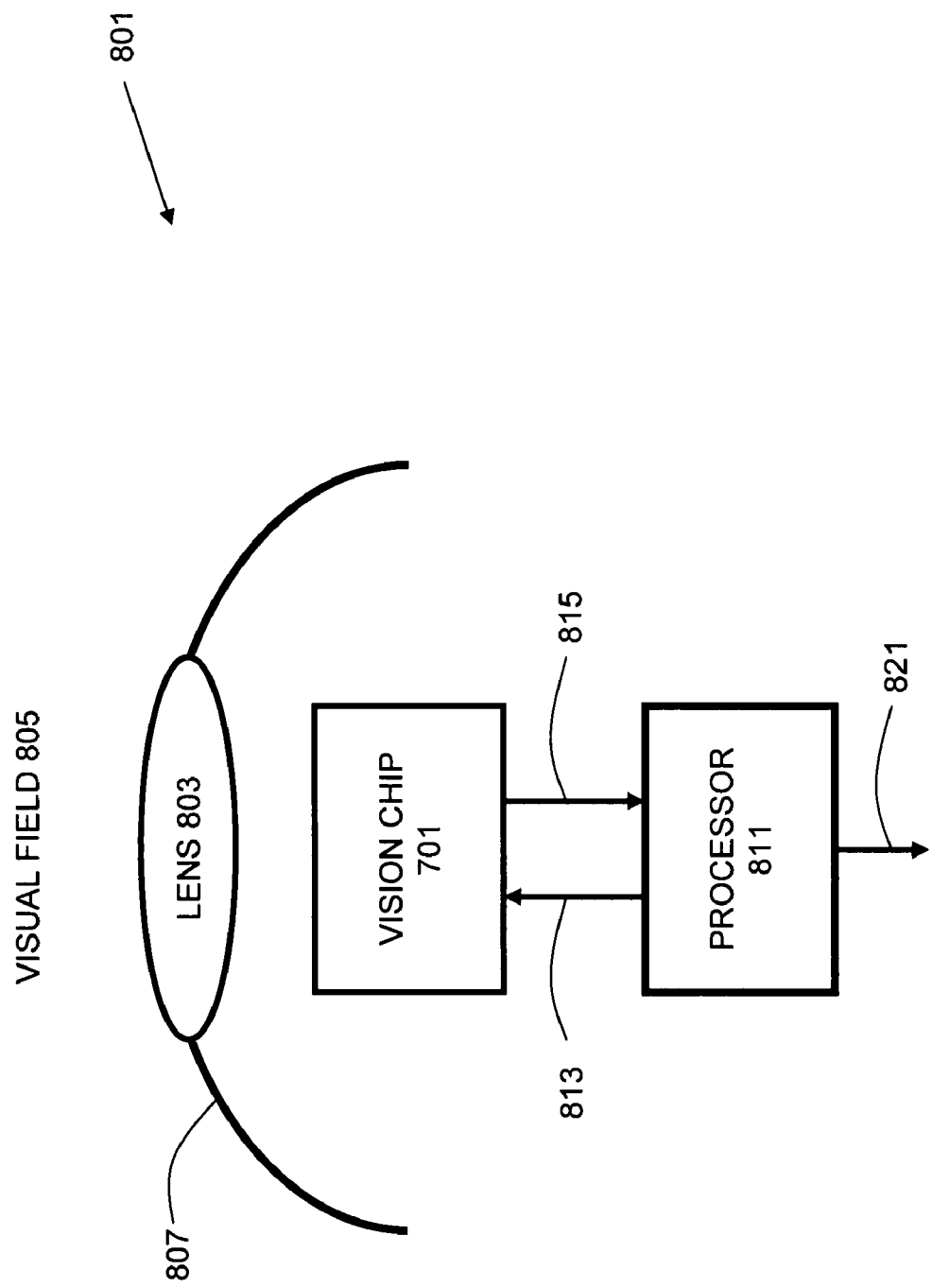
FIG. 8 illustrates an exemplary machine vision system incorporating an edge detecting vision chip.

Refer to FIG. 8, which illustrates an exemplary machine vision system 801 incorporating the exemplary edge detecting vision chip 701 of FIG. 7. A machine vision system is defined as any system that grabs an image based on the environment, processes the image, and generates an output based on the grabbed image. A lens 803 or another optical apparatus (such as a pinhole, mirror, or lens assembly) may be used to focus light from the visual field 805 to form an image on the vision chip 701. The visual field 805 is defined as the region of the environment that is visible by the vision chip 701 as a result of the position of the vision chip 701 and the lens 803 and the size of the vision chip 701. The lens 803 or other optical apparatus may be supported by an optical enclosure 807 which holds the lens 803 at a predetermined distance from the vision chip 701 and prevents stray light from striking the vision chip 701. A processor 811 is electrically connected to the vision chip 701. A set of electrical signals 813 is generated by the processor 811 and sent to the vision chip 701. These signals 813 may include row command signals 713, switch signals sel1 531 through sel4 534, and the signal phi 545. The processor 811 may also receive signals 815 from the vision chip 701, which may include the binarized edge signals 605 or a binarized image generated by the reconfigurable binary generator array 601. The processor 811 may be programmed to generate an output 821 based on the data generated by the vision chip 701. If the processor 811 is programmed to sense visual motion and/or optical flow, and generate measurements based on the visual motion and/or optical flow, then the machine vision system 801 may be referred to as an optical flow sensor.

The processor 811 may be a microcontroller, a digital signal processor (DSP), a microprocessor, or any other device that processes information. The processor may be a device that generates switch signals sel1 531 through sel4 534 and phi 545, and generates a digital signal or set of digital signals based on the vision chip output. The processor may optionally be embedded on the vision chip 701.

The bias signals prsupply 213, dabias 319, hplevel 343, hpbias 345, nbias 461, vref 651, and any other required bias signals may be generated on or off the vision chip 701, and may be generated using a resistor network or any other appropriate bias voltage generator. Note that a machine vision system incorporating a vision chip may be realized using any other implementations known in the art and the description presented herein is for illustration purposes and does not limit the scope of the present teaching.

The machine vision system 801, and modifications thereof, may also be referred to as "visual sensors".

It is possible to implement an optical flow sensor using the machine vision system 801 of FIG. 8. This may be achieved by programming the processor 811 with an algorithm enabling it to compute one or more optical flow measurements based on motion in the visual field 805. Essentially this algorithm monitors the binarized image generated by the vision chip 701 over time and generates optical flow measurements based on any motion. This binarized image contains digital ones and zeros corresponding to the placement of visual edges in the visual field 805, and thus motion in the visual field will produce corresponding motion in the binarized image.

If the visual motion is to the right, the binary values in the binarized image will move to the right, and vice versa. Those having a skill in the art of image processing will be able to write a program that tracks the motion of these high values, and thus compute optical flow from the binarized image. Candidate algorithms are described in U.S. Pat. Nos. 6,020,953 and 6,384,905. Many other optical flow algorithms from the academic literature may be modified and adapted for use in the above exemplary embodiment, including correlation or block-matching algorithms.

In the above first exemplary embodiment, edge detector circuits were used to generate edge signals in the exemplary focal plane circuit 401. The edge detector circuits may be replaced with a broader class of circuits called "feature detector circuits" that implement a wider variety functions based on the photoreceptor signals. A feature detector circuit is defined as any circuit that receives as input one or more photoreceptor signals, and generates one or more outputs, which may be referred to as "feature signals". A feature detector circuit may also be referred to as a "feature detector". Therefore the class of edge detector circuits is a subset of the class of feature detector circuits, and an edge signal is likewise a feature signal.

A feature detector circuit has associated with it a feature function that defines how its outputs are generated based on its inputs. For example, the exemplary edge detector circuit as shown in FIGS. 3A and 3B and connected as shown in FIG. 4 may be described as implementing a [−1 +1] feature function, because it adds the negative of a photoreceptor signal on the left to a photoreceptor circuit on the right. Each edge detector circuit may be replaced with circuits that implement more complex feature functions, such as [−1 +2 −1], [−1 −1 +1 +1], or [−1 0 +1] and as described in U.S. Pat. No. 6,384,905. Such feature detector circuits may be capable of computing linear functions and/or non-linear functions based on the photoreceptor signals. Such feature detector circuits may compute a function that is based on not just the current input values but on past input values as well. For example, a feature detector may receive as input just one photoreceptor signal and generate a feature signal based on the photoreceptor signal and any temporal derivatives of the photoreceptor signal. Such feature detector circuits may also be connected to photoreceptor circuits vertically as well as horizontally as shown in FIG. 4. Such feature detector circuits may also be reconfigurable, enabling them to implement different feature functions.

Descriptions of how feature detectors may be incorporated into the teachings herein may be obtained by replacing references to "edge detector circuits", "edge signals", and "binarized edge signals" respectively with "feature detector circuits", "feature signals", and "binarized feature signals". Note that a feature detector circuit may be realized using any other implementations known in the art and the description presented herein is for illustration purposes and does not limit the scope of the present teaching.

Figure 9:
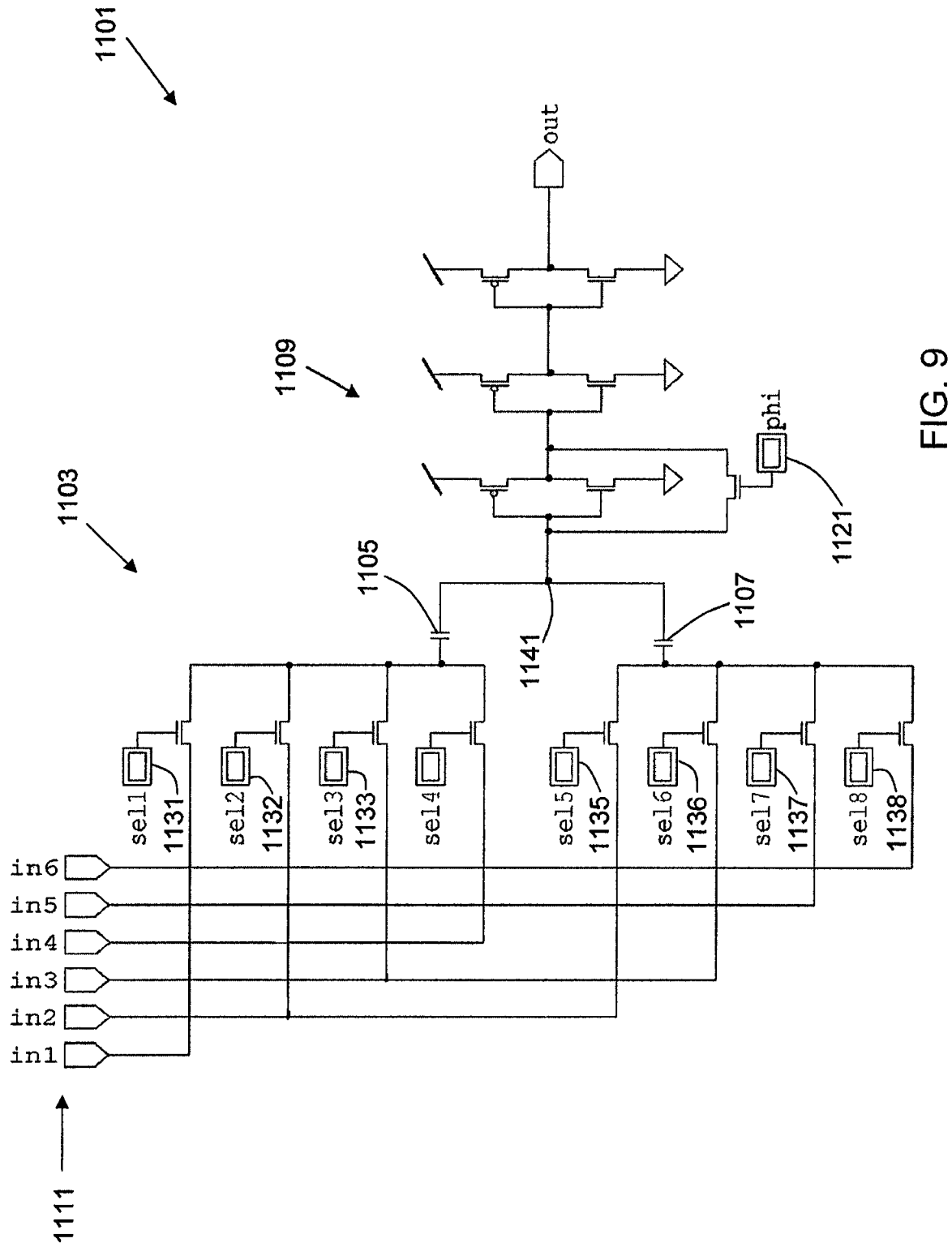
FIG. 9 illustrates a schematic diagram of an exemplary binary generator circuit, according to another embodiment of the present teaching.

Binary generator circuits and binary generator arrays may be implemented in other ways. Refer to FIG. 9, which illustrates a schematic diagram of an exemplary binary generator circuit 1101, according to another embodiment of the present teaching. The exemplary binary generator circuit 1101 is identical to the exemplary binary generator circuit 501 of FIG. 5, except for its input section 1103. Input section 1103 has two capacitors 1105 and 1107 instead of one, each capacitor having four input transistors on the left-hand side. Each input transistor is operated by its own global switching signal. The left-hand sides of the input transistors may be connected to an array of input nodes 1111 as shown in FIG. 9. Input transistors may share an input node with another input transistor, for example inputs in2 and in3 as shown in FIG. 9, to enable certain types of binarization functions to be computed. The inverter section 1109 of the exemplary binary generator circuit 1101 may be identical in construction and usage to the inverter section 505 of FIG. 5.

An array of such reconfigurable binary generator circuits may be connected together to form a reconfigurable binary generator array in much the same manner as the binary generator array 601 of FIG. 6.

An advantage of the exemplary binary generator circuit 1101 is that the use of multiple capacitors enables a wider variety of binarization functions to be implemented. For example, the binarization function "output 1 if 2Vin2<Vin1+Vin3, and output 0 otherwise" may be implemented using the following sequence of operations:

First, set global node phi 1121 to high.
Second, set switch signals sel1 1131 and sel6 1136 high, and all the other switch signals low. Delay to allow the circuit to settle.
Third, set phi 1121 to low.
Fourth, set switch signals sel2 1132 and sel5 1135 high, and all the other switch signals low.

After a delay, this circuit will output the binarized signal. The "2Vin2" term is possible to compute due to the fact that both capacitors 1105 and 1107 may be connected to input in2 by enabling switch signals sel2 and sel5. Other similar types of reconfigurable binary generator circuits may be constructed by using yet a larger network of input capacitors and/or a different network of input switching transistors.

The exemplary binary generator circuit may be further modified by adding an additional capacitor (not shown) connected to node 1141 with the other end connected to a global node name "dither" (not shown). This capacitor may be used to purposely inject an offset into the binary generator circuit by changing the potential of global node "dither" after signal phi 1121 is set low. This capacitor may be implemented as a "metal-metal" capacitor physically located on top of the capacitors 1105 and 1107 to save space.

Note that a binary generator circuit and a reconfigurable binary generator circuit may be realized using any other implementations known in the art and the description presented herein is for illustration purposes and does not limit the scope of the present teaching.

Another variation is to utilize one or more winner-takes-all circuits in place of the exemplary binary generator array 601 of FIG. 6. A winner-takes-all circuit is a circuit that receives as input an array of analog inputs and generates an array of binary outputs, with one digital level, usually but not necessarily a digital "1", corresponding to the analog inputs that are the most positive, and the other digital level used for the other outputs. Such winner-takes-all circuits are described in U.S. Pat. Nos. 6,020,953 and 6,384,905. For example, a five-input winner-takes-all circuit may receive as input the signals 2.5, 2.8, 3.0, 2.4, and 1.9, and output a corresponding digital pattern 00100. The winner-takes-all circuit may be configured to receive as input edge signals or feature signals, and the output generated by the winner-takes-all circuit would be used as the binarized edge signals or binarized feature signals. Any of the winner-takes-all variants of my U.S. Pat. No. 6,020,953 may be used, including but not limited to winner-take-all circuits, k winners-take-all circuits, local winners-take-all circuits, k-local winners-take-all circuits, and the generalized winner-take-all circuit. Corresponding "loser-take-all" circuits that identify input signals that are the least positive may also be used. Another possible winner-takes-all circuit that may be used is depicted in FIGS. 8A and 8B of U.S. Pat. No. 6,384,905.

Depending on the number of edge or feature signals that need to be binarized, it may be useful to use multiple smaller winner-takes-all circuits in place of a single larger one. For example, if there are 15 feature signals, rather than using a single 15-input winner-takes-all circuit, it may be preferable to use three five-input winner-takes-all circuits. The first winner-takes-all circuit would process feature signals 1 through 5, the second feature signals 6 through 10, and the third feature signals 11 through 15. The act of computing an array of binarized feature signals from an array of feature signals using any winner-takes-all circuit variant may be referred to as "computing a winner-takes-all function", whether this is performed in hardware or software.

The above teachings focus on the implementation of vision chips and machine vision systems that binarize feature signals along only one axis. Next is presented a vision chip that may be used to binarize feature signals along two axes.

Refer to FIG. 10A, which depicts an exemplary schematic diagram for a non-selectable edge detector circuit according to an embodiment of the present teaching 1401. This exemplary edge detector circuit 1401 depicted is identical to the exemplary edge detector circuit 301 of FIG. 3, except that edge detector circuit 1401 does not include transistor 363 and does not include a rowselect input 307. FIG. 10B shows the schematic symbol used hereinafter to depict a non-selectable edge detector circuit 1401. Note that a non-selectable edge detector circuit may be realized using any other implementations known in the art and the description presented herein is for illustration purposes and does not limit the scope of the present teaching.

Recall the exemplary focal plane circuit 401 of FIG. 4, which includes an array of photoreceptor circuits and an array of edge detector circuits meshed together. The exemplary focal plane circuit 401 may be conceptualized as an array of pixel circuits (not shown), in which each pixel circuit comprises one exemplary photoreceptor circuit 201 and one exemplary edge detector circuit 301, with the exemplary edge detector circuit 301 taking as input the photoreceptor signal from its own pixel cell and the photoreceptor signal from the pixel cell on the right. For example, photoreceptor circuit 441 and edge detector circuit 445 of FIG. 4 may be considered to be such a pixel circuit. The configuration shown in FIG. 4 allows the focal plane circuit 401 to detect edges with horizontal spatial derivatives only. For purposes of discussion, a "horizontal spatial derivative edge"" is defined to be an edge detectable by two photoreceptor circuits and an edge detector circuit oriented so that the photoreceptor circuits are adjacent to each other horizontally. Vertical spatial derivative edges are similar except that the spatial derivative of light intensity in the vertical direction is strong, and they are detectable by two photoreceptor circuits and an edge detector circuit oriented so that the photoreceptor circuits are adjacent to each other vertically. The acts of sensing horizontal intensity spatial derivatives and sensing vertical intensity spatial derivatives are respectively referred to as detecting horizontal spatial derivative edges and detecting vertical spatial derivative edges. It is possible to modify the exemplary focal plane circuit 401 so that spatial derivative edges in both the horizontal and vertical directions may be detected. One possible pixel circuit capable of detecting edges in both directions is described next.

Figures 11A, 11B:
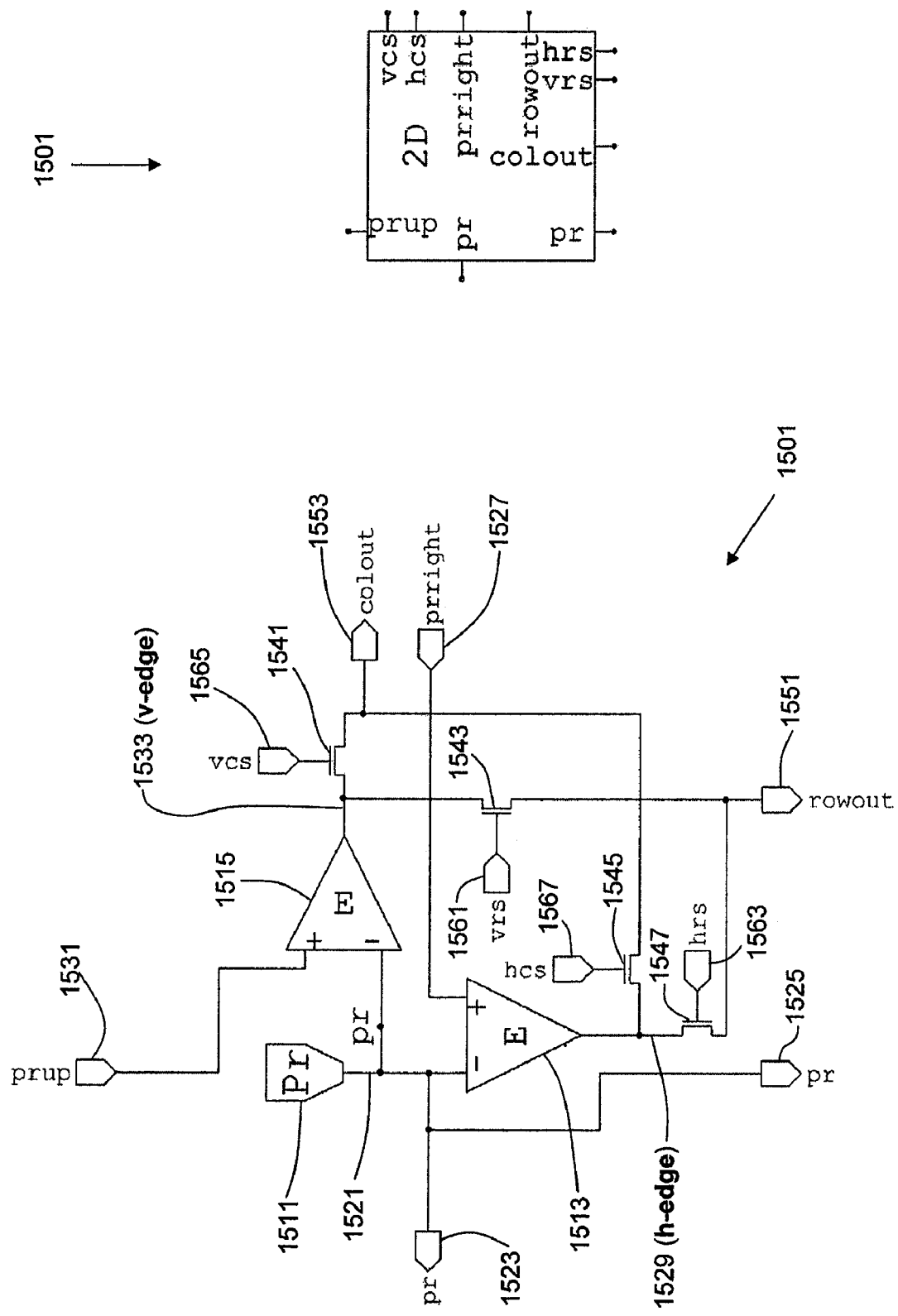
FIG. 11A depicts an exemplary two dimensional pixel circuit.
FIG. 11B illustrates an exemplary schematic symbol used to signify a two dimensional pixel circuit.

Refer to FIG. 11A, which depicts an exemplary two dimensional pixel circuit 1501 that is able to detect both horizontal and vertical spatial derivative edges. The two dimensional pixel circuit 1501 comprises a photoreceptor circuit 1511, a horizontally-connected edge detector circuit 1513, and a vertically-connected edge detector circuit 1515. The photoreceptor circuit 1511 outputs a photoreceptor signal to node pr 1521, which provides output to the left 1523 and downward 1525 directions, respectively to other two dimensional pixel circuits located adjacent in the downward and leftward directions. The horizontally-connected edge detector circuit 1513 also receives input from input prright 1527, which is connected to the photoreceptor output of the pixel circuit on the right. The horizontally-connected edge detector circuit 1513 generates an output to node h-edge 1529. Likewise, the vertically-connected edge detector circuit 1515 receives input from both photoreceptor circuit 1511 and the photoreceptor circuit above via input node prup 1531, and generates an output to node v-edge 1533.

The four transistors 1541, 1543, 1545, and 1547 are used to connect nodes h-edge 1529 and v-edge 1533 to outputs rowout 1551 and colout 1553, using connection signals vrs 1561, hrs 1563, vcs 1565, and hcs 1567. The manner in which these signals are used will be described below with FIG. 12.

FIG. 11B illustrates an exemplary schematic symbol used to signify a two dimensional pixel circuit of the architecture illustrated in FIG. 11A.

Note that a two dimensional pixel circuit may be realized using any other implementations known in the art and the description presented herein is for illustration purposes and does not limit the scope of the present teaching.

Figure 12:
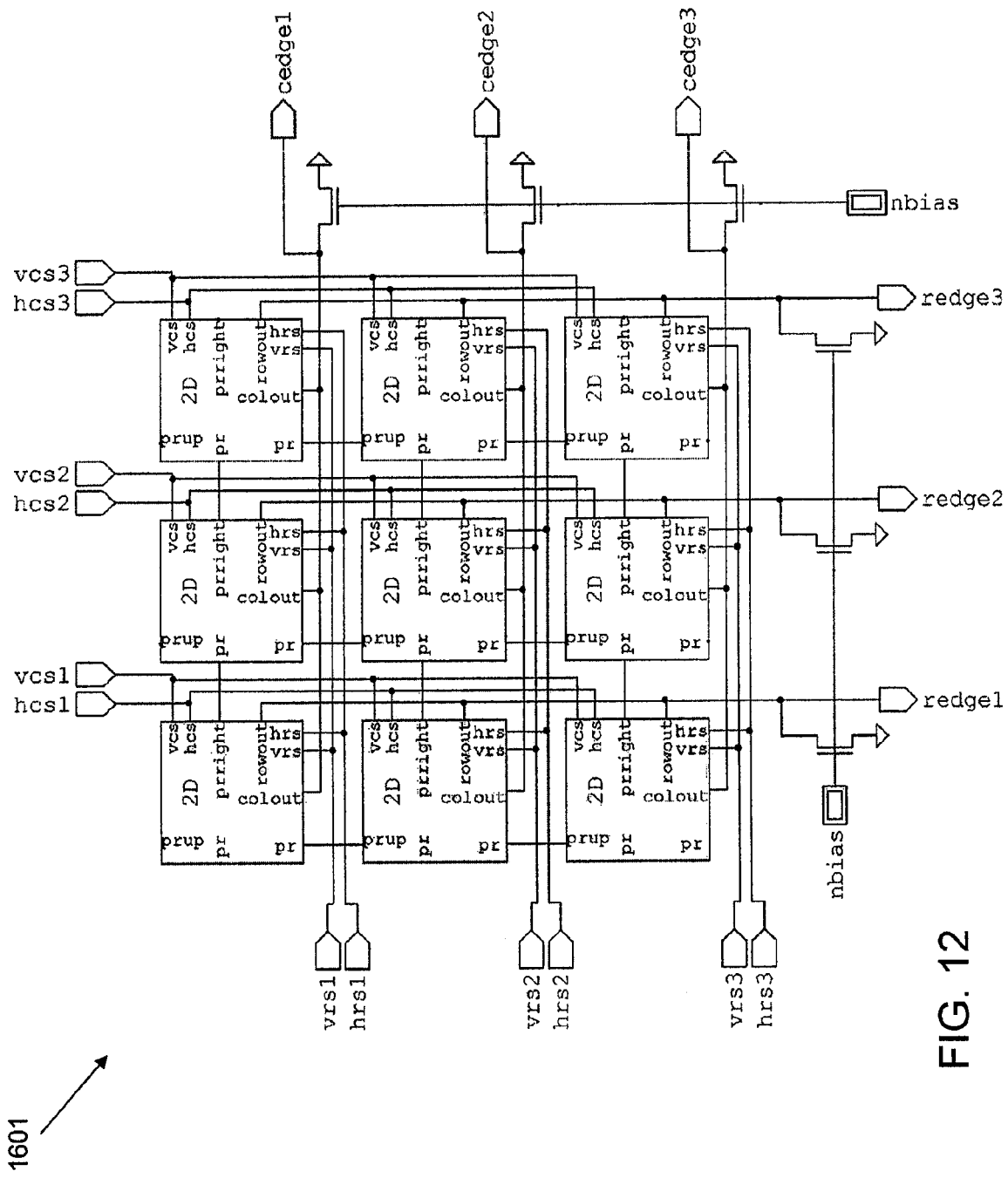
FIG. 12 depicts an exemplary two dimensional focal plane circuit according to an embodiment of the present teaching.

Refer to FIG. 12, which depicts an exemplary two dimensional focal plane circuit 1601 according to an embodiment of the present teaching. The exemplary two dimensional focal plane circuit 1601 is arranged in a 3-by-3 array. A 3-by-3 array is shown in FIG. 16 to simplify the schematic for discussion. A larger array may be constructed by expanding the number of rows and columns to the desired size. The circuit topology of the exemplary two dimensional focal plane circuit 1601 is similar to the focal plane circuit 401 of FIG. 4, except that there are both horizontal spatial derivative and vertical spatial derivative edge detectors, and the resulting h-edge 1529 and v-edge 1533 signals generated in the two dimensional pixel cells, may be each read out as columns or as rows.

The exemplary two dimensional focal plane circuit 1601 is constructed so that h-edge 1529 and v-edge 1533 are read out as follows: There are three vertical row select lines labeled vrs1, vrs2, and vrs3. Respectively there are three horizontal row select lines labeled hrs1, hrs2, and hrs3. There are also three vertical column select lines vcs1, vcs2, and vcs3, and three horizontal column select lines hcs1, hcs2, and hcs3. There are also three row edge signal lines redge1, redge2, and redge3. Finally there are three column edge signal lines cedge1, cedge2, and cedge3. The row edge signals and the column edge signals may also be referred to respectively as row feature signals and column feature signals. Every row readout line and column readout line is connected to a readout transistor, resulting in a source follower in the same manner as the readout transistor 459 from FIG. 4. These row edge signal lines and column edge signal lines form the output of the two dimensional focal plane 1601.

Edge signals may be read out by sending digital high signals down the appropriate row or column select lines. This causes the appropriate transistors within the selected pixel circuits to close, causing the selected signals to be placed onto the row edge signal lines and/or the column edge signals lines.

For example, if the signal hrs1 is set to digital high, then transistor 1547 for each of the pixel circuits in the top row of pixel circuits closes, causing the h-edge 1529 horizontal spatial derivative edge signals from the top row to be placed onto the row edge signal lines. Either vertical or horizontal spatial derivative edge signals may be placed onto the row edge signal lines, or similarly onto the column edge signal lines. Note that it is possible to send these spatial derivative signal lines to row and column edge signal lines concurrently. To avoid interference, when simultaneously placing signals onto both row and edge signal lines simultaneously, it is preferable to send one type of spatial derivative edge signal to the rows and the other type of spatial derivative edge signal to the columns.

Note that in some instances one or all edge signals being read out may contain meaningless information. For example, when reading out horizontal spatial derivative edge signals onto the row edge signal lines, the right-most edge signal, redge3, will be meaningless. This is because for these pixel circuits, node prright 1527 is not connected to a photoreceptor signal, thus the edge detector 1513 generates a meaningless output. As another example, when reading out the first row of vertical spatial derivative edge signals onto the row edge signal lines, all three edge signals will be meaningless. This is because the prup 1531 inputs to the top row of two dimensional pixel circuits are not connected to anything.

The exemplary two dimensional focal plane circuit 1501 is one of many configurations of two dimensional focal plane circuits that may be implemented. Other variations may include using feature detector circuits in place of, or in addition to, the edge detector circuits 1513 and 1515. Yet other variations may include using an array geometry other than rectangular or square. For example, pixel circuits may be designed to be connected along a hexagonal grid, and may include three edge detector circuits rather than two to enable the detection of edges in three directions 60° apart. Note that a two dimensional focal plane circuit may be realized using any other implementations known in the art and the description presented herein is for illustration purposes and does not limit the scope of the present teaching.

Figure 13:
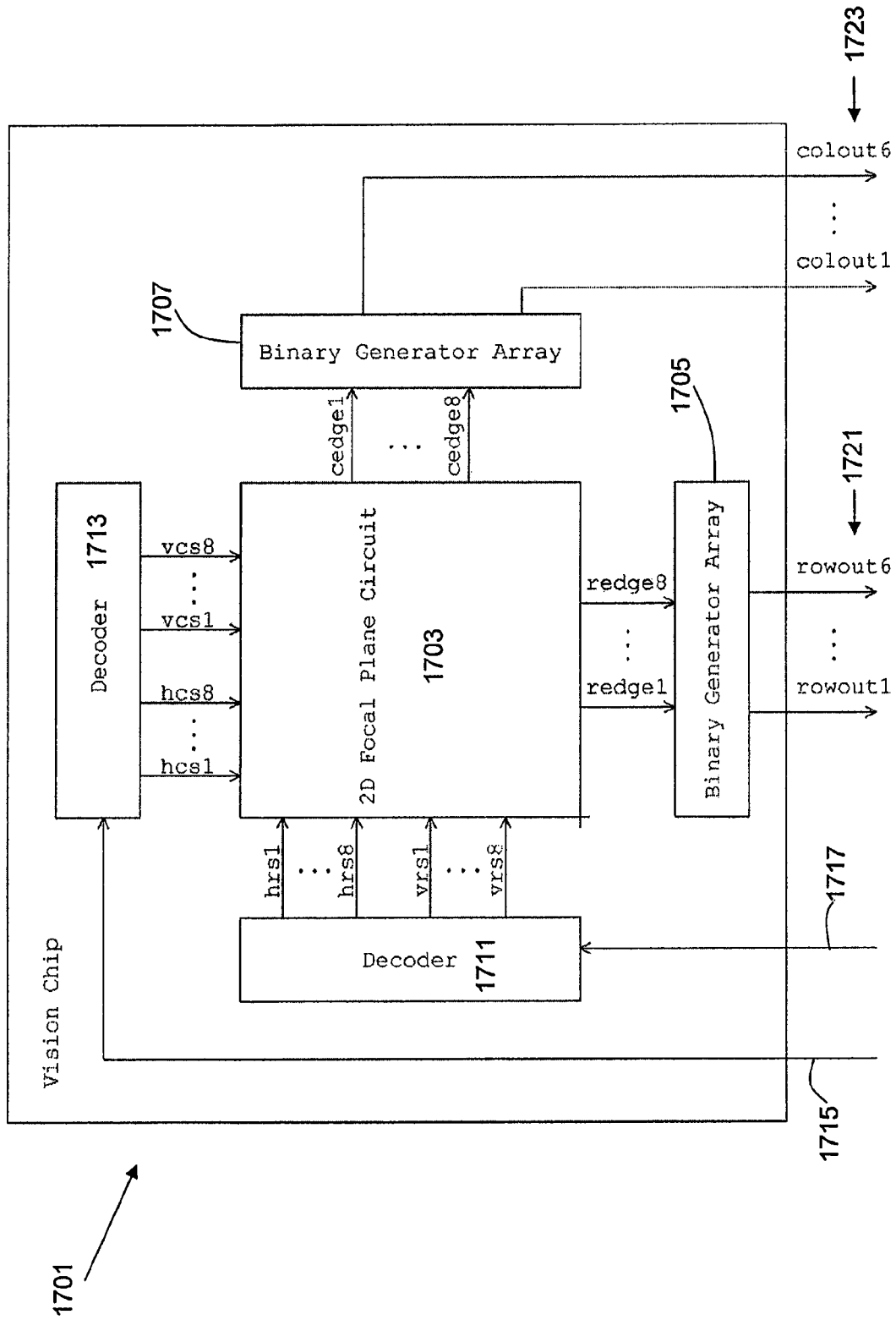
FIG. 13 depicts an exemplary two dimensional edge detecting vision chip, according to an embodiment of the present teaching.

Refer to FIG. 13, which depicts an exemplary two dimensional edge detecting vision chip 1701, according to an embodiment of the present teaching. This vision chip 1701 is similar to the vision chip 701 of FIG. 7 except that it implements edge detector circuits in both the horizontal and vertical directions using an array 1703 of exemplary two dimensional pixel circuits 1501. The array 1703 may be constructed in a manner similar to the two dimensional focal plane circuit 1601 of FIG. 12, except utilizing a larger array size. For discussion purposes, let the array 1703 of FIG. 13 comprise an 8-by-8 array of exemplary two dimensional pixel circuits. Row edge signals redge1 through redge8 are sent to a row reconfigurable binary generator array 1705. The reconfigurable binary generator array 1705 generates an array of binarized row edge signals rowout1 through rowout6 based on the row edge signals. Column edge signals cedge1 through cedge8 are sent to the column reconfigurable binary generator array 1707. The reconfigurable binary generator 1707 generates an array of binarized column edge signals colout1 through colout6 based on the column edge signals.

These reconfigurable binary generator arrays 1705 and 1707 may be constructed as shown in FIG. 6, or may be constructed using any other binary generator array or reconfigurable binary generator array including those described above.

The vision chip 1701 also contains decoders 1711 and 1713, which respectively receive command signals 1715 and 1717 from off-chip. The decoders 1711 and 1713 are simple combinational logic blocks whose purpose is to generate the appropriate row and column select signals.

The row and column reconfigurable binary generator arrays 1705 and 1707 may be constructed in the same manner as the reconfigurable binary generator array 601 of FIG. 6. The binary generator arrays 1705 and 1707 respectively generate binarized feature signal arrays 1721 and 1723 that may form the output of the vision chip 1701. Alternatively, one reconfigurable binary generator array may be used and may be multiplexed to be able to process either the binarized row edge signals or the binarized column edge signals. Global signals sel1 531 through sel4 534 (not shown) and phi 545 (not shown) used by the reconfigurable binary generator arrays may be obtained as inputs to the vision chip 1701.

The vision chip 1701 may be used in the machine vision system 801 of FIG. 8 by replacing vision chip 701 with the vision chip 1701. The processor may be configured to generate command signals 1715 and 1717 and to receive and process the binarized feature signals 1721 and 1723.

The sensor 801 may then be configured to compute two dimensional optical flow by computing optical flow based on the binarized feature signals 1721 and 1723. The horizontal component of optical flow may be computed by measuring optical flow based on the binarized feature signals 1721. Likewise the vertical component of optical flow may be computed by measuring optical flow based on the binarized feature signals 1723. The horizontal and vertical components may then be combined to form two dimensional optical flow measurements.

Another variation that may be made to the above teachings is to utilize a microcontroller or another field-programmable device for the processor 811 of FIG. 8. The microcontroller or other device may have on-chip flash memory which may be used to store a program. This program may then be used to generate an output 821, such as an optical flow measurement, another measurement, or a processed image, based on any information

I claim:

1. A visual sensor, comprising:
a set of first circuits configured in parallel to generate a plurality of analog signals based on information observed from a visual field;
a set of second circuits configured in parallel to generate a plurality of analog feature signals based on the plurality of analog signals;
a third circuit capable of generating a plurality of binarized feature signals based on the plurality of analog feature signals and in accordance with a function selected from a plurality of possible functions based on a plurality of switch signals, wherein
the third circuit comprises a plurality of binary generators configured in parallel to generate a plurality of binary values based on the plurality of analog feature signals and the selected function,
each of the plurality of binary generators generates at least one of the plurality of binary values based on at least two of the plurality of analog feature signals, and
the third circuit generates the plurality of binarized feature signals based on the plurality of binary values, wherein
the plurality of analog signals relate to photo perception,
the third circuit is reconfigurable.

2. The visual sensor of claim 1, wherein the set of first circuits, the set of second circuits, and the third circuit is implemented in an integrated circuit.

3. The visual sensor of claim 1, wherein
values of the switch signals are set according to a need of an application deploying he visual sensor; and
each combination of the values of the switch signals as set corresponds to a selectable function.

4. The visual sensor of claim 1, wherein each of the plurality of binary generators comprises at least one switched capacitor circuit.

5. The visual sensor of claim 4, wherein the set of first circuits, the set of second circuits, and the third circuit is implemented in an integrated circuit.

6. The visual sensor of claim 1, further comprising a processor capable of generating an optical flow measurement based on the plurality of binarized feature signals.

7. The visual sensor of claim 1, wherein the set of second circuits is associated with a plurality of time domain filters.

8. The visual sensor of claim 1, wherein the set of second circuits is associated with a plurality of active load circuits.

9. The visual sensor of claim 8, wherein the set of second circuits is further associated with a plurality of time domain filters.

10. The visual sensor of claim 1, wherein the set of first circuits is associated with a plurality of photoconductive elements.

11. The visual sensor of claim 10, wherein the set of first circuits is further associated with a plurality of transduction circuits.

12. The visual sensor of claim 1, further comprising a processor configured for generating an output based on at least one of the plurality of analog signals, the plurality of analog feature signals, and the plurality of binarized feature signals.

13. A visual sensor, comprising:
a focal plane circuit capable of generating a plurality of analog feature signals based on information observed from the visual field, comprising:
a plurality of photoreceptor circuits configured in parallel to generate a plurality of photoreceptor signals based on the information observed from a visual field, and
a plurality of feature detector circuits configured in parallel to generate the plurality of analog feature signals based on the plurality of photoreceptor signals and in accordance with a feature function, wherein
each of the plurality of feature detector circuits receives as input at least two of the plurality of photoreceptor signals, and
each of the plurality of analog feature signals is generated based on the at least two of the plurality of photoreceptor signals; and
a binarization circuit capable of generating a plurality of binarized feature signals based on the plurality of analog feature signals and in accordance with a binarization function selectable from a plurality of possible functions based on a plurality of switch signals, wherein
the binarization circuit comprises a plurality of binary generators configured in parallel to generate a plurality of binary values based on the plurality of analog feature signals,
each of the plurality of binary generators generates at least one of the plurality of binary values based on at least two of the plurality of analog feature signals and the binarization function, and
the binarization circuit generates the plurality of binarized feature signals based on the plurality of binary values.

14. The visual sensor of claim 13, wherein each of the plurality of binary generators is capable of computing a comparison based on whether a first function of the at least two of the plurality of analog feature signals is greater than a second function of the at least two analog feature signals, and
each of the plurality of binary generators is capable of generating the corresponding binary value based on the computed comparison.

15. The visual sensor of claim 14, further comprising a processor capable of generating an optical flow measurement based on the plurality of binarized feature signals.

16. The visual sensor of claim 13, wherein the feature function is based on a substantially linear feature function.

17. The visual sensor of claim 13, wherein each of the plurality of binary generators comprises:
a capacitor having a first side and a second side;
a plurality of switches, wherein
the first side of each switch is connected to the first side of the capacitor and the second side of each switch is connected to one of the plurality of analog feature signals,
each switch connects to a different analog feature signal, and
the plurality of switches may be operated to electrically connect the first side of the capacitor to any of the corresponding analog feature signals electrically connectable through the plurality of switches;
an amplifying circuit connected to the second side of the capacitor; wherein
the amplifying circuit comprises a circuit selected from the group consisting of an amplifier and an inverter;
the amplifying circuit generates an amplified signal; and
the binary signal generator generates the corresponding binary value based on the amplified signal.

18. The visual sensor of claim 17, further comprising a processor capable of generating an optical flow measurement based on the plurality of binarized feature signals.

19. The visual sensor of claim 13, wherein each of the plurality of binary generators comprises:
an amplifying circuit;
a plurality of switches, wherein
the first side of each switch is connected to the amplifying circuit and the second side of each switch is connected to one of the plurality of analog feature signals,
each switch is connected to a different analog feature signal, and
the plurality of switches may be operated to electrically connect the first side of the capacitor to any of the corresponding analog feature signals electrically connectable through the plurality of switches; wherein
the amplifying circuit generates an amplified signal; and
the binary generator generates the corresponding binary value based on the amplified signal.

20. A visual sensor, comprising:
a focal plane circuit capable of generating a plurality of analog row signals based on information observed from the visual field, comprising:
a plurality of photoreceptor circuits configured in parallel to generate a plurality of photoreceptor signals based on the information observed from a visual field, and
a plurality of feature detector circuits configured in parallel to generate a plurality of analog feature signals based on the plurality of photoreceptor signals and in accordance with a feature function, wherein
each of the plurality of feature detector circuits receives as input at least two of the plurality of photoreceptor signals,
each of the plurality of analog feature signals is generated based on the at least two of the plurality of photoreceptor signals, and
the focal plane circuit is capable of generating the plurality of analog row signals based on the plurality of analog feature signals and based on a selection signal; and
a binarization circuit capable of generating a plurality of binarized feature signals based on the plurality of analog row signals and in accordance with a binarization function, wherein
the binarization circuit comprises a plurality of binary generators configured in parallel to generate a plurality of binary values based on the plurality of analog row signals,
each of the plurality of binary generators generates at least one of the plurality of binary values based on at least two of the plurality of analog row signals and the binarization function, and
the binarization circuit generates the plurality of binarized feature signals based on the plurality of binary values.

21. The visual sensor of claim 20, wherein each of the plurality of binary generators is capable of computing a comparison based on whether a first function of the at least two of the plurality of analog row signals is greater than a second function of the at least two analog row signals, and
each of the plurality of binary generators is capable of generating the corresponding binary value based on the computed comparison.

22. The visual sensor of claim 20, wherein each of the plurality of binary generators comprises:
an amplifying circuit;
a plurality of switches, wherein
the first side of each switch is connected to the amplifying circuit and the second side of each switch is connected to one of the plurality of analog row signals,
each switch is connected to a different analog row signal, and
the plurality of switches may be operated to electrically connect the first side of the capacitor to any of the corresponding analog row signals electrically connectable through the plurality of switches; wherein
the amplifying circuit generates an amplified signal; and
the binary generator generates the corresponding binary value based on the amplified signal.

* * * * *